United States Patent [19]
Hirakawa et al.

[11] Patent Number: 5,281,495
[45] Date of Patent: Jan. 25, 1994

[54] ALKALINE STORAGE CELL HAVING A NEGATIVE ELECTRODE COMPRISING A CADMIUM ACTIVE MATERIAL

[75] Inventors: Akira Hirakawa; Hironori Honda; Toshihiro Inoue; Yutaka Doi; Yoshiyuki Fujimoto; Toshiaki Shiojiri; Ryuuji Kawase, all of Sumoto, Japan

[73] Assignee: Sanyo Electric Co., Ltd., Moriguchi, Japan

[21] Appl. No.: 25,401

[22] Filed: Feb. 26, 1993

[30] Foreign Application Priority Data

| Feb. 28, 1992 | [JP] | Japan | 4-044025 |
| May 15, 1992 | [JP] | Japan | 4-123631 |
| May 22, 1992 | [JP] | Japan | 4-131131 |
| Oct. 30, 1992 | [JP] | Japan | 4-292910 |
| Nov. 25, 1992 | [JP] | Japan | 4-315137 |
| Nov. 30, 1992 | [JP] | Japan | 4-320942 |
| Dec. 22, 1992 | [JP] | Japan | 4-342924 |

[51] Int. Cl.$^5$ .............. H01M 4/62; H01M 4/38
[52] U.S. Cl. .............................. 429/217; 429/222
[58] Field of Search .............. 429/222, 223, 254, 217; 252/182.1

[56] References Cited

U.S. PATENT DOCUMENTS

| 4,990,414 | 2/1991 | Matsui et al. | 429/222 X |
| 5,180,646 | 1/1993 | Berger et al. | 429/222 X |
| 5,185,223 | 2/1993 | Berger et al. | 429/222 X |

FOREIGN PATENT DOCUMENTS

| 0030433 | 3/1979 | Japan | 429/222 |
| 0131764 | 7/1985 | Japan | 429/222 |
| 62-281267 | 12/1987 | Japan | |

Primary Examiner—John S. Maples
Attorney, Agent, or Firm—Armstrong, Westerman, Hattori, McLeland & Naughton

[57] ABSTRACT

Disclosed is a rechargeable alkaline storage cell having a negative electrode, a positive electrode, and a separator disposed between the electrodes. The negative electrode has an active material layer and a conductive layer formed on the active layer, the active layer including cadmium active material, the conductive layer including polyvinylpyrrolidone as a binder and conductive powder.

23 Claims, 24 Drawing Sheets

ALKALINE STORAGE CELL HAVING A NEGATIVE ELECTRODE COMPRISING A CADMIUM ACTIVE MATERIAL

BACKGROUND OF THE INVENTION (1) Field of the Invention

This invention relates to an alkaline storage cell such as a nickel-cadmium storage cell, and particularly to the improvement of a cadmium pasted negative electrode and a separator both used for such a cell.

(2) Description of the Related Art

Cadmium negative electrodes used for alkaline storage cells such as nickel-cadmium storage cells are mainly produced by either sintering process or pasting process. In the sintering process, nickel powder is sintered to a porous substrate which holds an active material. In the pasting process, an active material is kneaded into a paste together with a synthetic fiber such as polyamide fiber and an adhesive agent, and then applied to a conductive substrate such as a punched metal. The latter process is becoming predominant because of less expense and higher energy density.

However, such nickel-cadmium storage cell using a pasted negative electrode has the following problems:

I. Problems in the negative electrode (1) In the cadmium pasted negative electrode, which includes no conductive substrate, the active material has extremely poor conductivity. As a result, metal cadmium, which absorbs oxygen gas arising from the positive electrode when the cell is overcharged, is generated mainly from the internal of the negative electrode and rarely from its surface. Therefore, the oxygen gas outside the electrode is hard to be absorbed through the vicinity of the poorly air-permeable surface, presenting deficient oxygen gas absorption performance.

(2) In the cadmium pasted negative electrode, which includes no supporter for the active material, cadmium intermediate dissolved during a charge/discharge operation in the electrolyte inside the electrode is transferred into the separator. This is called "migration", which leads to internal short, which ends the cell life. This migration mainly results from that the volume change in the active material during a charge/discharge operation causes the electrolyte containing the cadmium intermediate thus dissolved therein to be pushed out to the separator.

(3) In the cadmium pasted negative electrode, undischargeable metal cadmium is accumulated in the repetition of charge/discharge operation by being covered with precipitated cadmium hydroxide or by active material coarsening, and as a result, the cell capacity is diminished. Such deterioration of the negative electrode is especially encouraged in a low-rate charge/high-rate discharge operation or a discharge operation in a low temperature, quickening the end of the cell life.

(4) When the cell was left in a high temperature for a long period of time, the active material is coarsened due to the change in its crystal form and its particles are agglomerated. This lessens the utilization of the entire active material, damaging charging property and the like, whereby the cell capacity is diminished.

To solve these problems, various proposals have been made as follows:

(1) As described in Japanese Laid-Open Patent Application No. 2-90461, a porous nickel layer is formed by electrolytic plating on the surface of the negative electrode which uses polyamide fiber as a reinforcing agent in a cadmium compound as an active material, and additionally a magnesium compound is added.

According to this method, the conductive porous nickel layer improves the conductivity of the surface of the electrode, thereby accelerating the production of metal cadmium on the surface during a charging operation. As a result, the oxygen gas absorption performance has been improved. Furthermore, the nickel layer blocks cadmium intermediate transferring toward the separator, thus restraining the migration of cadmium. This migration is further restrained by the magnesium compound added which works as crystalline nucleus to precipitate the cadmium intermediate dissolved in the electrolyte.

Such method, however, still has the following problems:

Nickel in the nickel layer depresses hydrogen overvoltage, whereby hydrogen gas easily arises by a slight polarization during a charging operation. The hydrogen gas thus arose remains within the cell without being consumed, so that the safety valve works at a certain amount of pressure, which might spoil the sealed form of the cell.

The plating to form the nickel layer requires additional power equipment and a large amount of power in addition to many processes including water washing and drying, which leads to higher production cost of the cell.

Since the polyamide fiber used as a reinforcing agent is 10 $\mu$m thick, the mesh structure composed of such thick fiber can not sufficiently restrain the change in the volume of the active material.

The polyamide fiber, which is vulnerable to alkali, turns into carbonate ion when dissolved in the electrolyte, and the growth of the carbonate ion accelerates the migration of cadmium.

(2) As described in Japanese Patent Publications Nos. 2-50585 or 2-34433, a conductive layer composed of carbon powder and a binder is formed on the surface of the negative electrode.

According to this method, the oxygen gas absorption performance can be improved with ease and at low cost without any special producing process.

In such method, however, the conductive layer is gradually destroyed with the progress of charge/discharge cycle because its intensity is lowered by the poor adhesion of the binder, thus being unable to retain the oxygen gas absorption performance for a long period of time.

(3) As described in Japanese Laid-Open Patent Application No. 3-127450, the negative electrode is hydrated and then coated with polyvinylpyrrolidone (hereinafter referred to as PVP) or the like.

According to this method, the deactivation of the negative electrode caused with the progress of charge/discharge cycle can be restrained to some extent; however, it can not in a high-rate discharge operation or in some other conditions. In addition, a non-conductive layer is formed on the surface of the active material layer, which deteriorates the oxygen gas absorption performance of the electrode.

(4) As described in Japanese Laid-Open Patent Application No. 63-116361, a calcium compound is added to the negative electrode itself.

According to this method, calcium works as crystalline nucleus to precipitate cadmium hydroxide, restraining the crystal grains of the active material from coarsening when the cell has been left for a long period of time. Accordingly, the decrease in the cell capacity can be prevented.

Such method, however, still has a problem that the discharging performance is tremendously lowered with the progress of charge/discharge cycle, so that remaining cadmium is accumulated until the cycle characteristic is deteriorated.

II. Problems in the separator

Nylon conventionally used for the separators of the above-mentioned nickel-cadmium alkaline storage cells has been tried to replace by polyolefine resin, which is chemically stable unlike nylon. And especially polypropylene (hereinafter referred to as PP) nonwoven cloth has been popular mainly for cells operated in a high temperature.

However, such PP separators are poorer in hydrophilic property and electrolyte holding power than the nylon separators, so that in such cells using the PP separators, dryout (exhaustion of electrolyte in the separators) arises earlier in the charge/discharge cycle.

Some proposals were made to solve this problem, in which a hydrophilic group is graft polymerized to the PP fiber by erradiating radiation, or the separator is put through sulfonation treatment to improve its hydrophilic property. However, such effects can not be retained for a long period of time, and the mechanical strength of the separator is weakened by the treatment.

In the proposal in Japanese Patent Publications No. 4-7548, a PP separator is applied with hydrophilic property through a reaction with reaction gas containing fluorine, which has the advantage of retaining hydrophilic property comparatively for a long period.

However, when this PP separator is put in a cell together with the pasted electrode having a conductive layer composed of carbon powder formed thereon, which is shown in the above-mentioned Japanese Patent Publications No. 2-50585, the oxygen gas absorption performance is deteriorated because the surface of the negative electrode is covered with a large amount of electrolyte, whereby it becomes hard to form boundaries of three phases containing gas, a liquid, and a solid on the surface of the electrode. Also, the discharging performance of the cadmium negative electrode is deteriorated at an early stage of the charge/discharge cycle. As a result, the capacity of the cell is greatly reduced, falling into the control by the capacity of the negative electrode, whereby the cycle characteristic is deteriorated.

SUMMARY OF THE INVENTION

An object of this invention, therefore, to provide an alkaline storage cell with improved cell characteristic including cycle characteristic.

Another object of this invention is to provide an alkaline storage cell capable of retaining a satisfactory oxygen gas absorption performance for a long period of time even under severe conditions such as a high-rate charging.

Another further object of this invention is to provide an alkaline storage cell capable of restraining cadmium active material in the negative electrode from deactivating and migrating.

Another still further object of this invention is to provide an alkaline storage cell capable of restraining the pressure raise inside the cell and the volume change of the active material of the negative electrode.

The other object of this invention is to provide an inexpensive alkaline storage cell.

These objects can be achieved by a rechargeable alkaline storage cell comprising a negative electrode including an active material layer and a conductive layer formed on the active layer, the active layer including cadmium active material, the conductive layer including PVP as a binder and conductive powder; a positive electrode; and a separator disposed between the electrodes.

The above-mentioned objects can be achieved also by a rechargeable alkaline storage cell comprising a negative electrode including an active material layer and a conductive layer formed on the active layer, the active layer including active material paste mainly composed of a cadmium active material, the paste being coated on the conductive substrate, the conductive layer including PVP as a binder and conductive powder; a positive electrode; and a separator disposed between the electrodes.

The following are the bases for these objects to be achieved.

(1) It is known that both the oxygen gas absorption performance and the migration of the active material of a cadmium pasted negative electrode are greatly affected by the conditions of the surface of the electrode. Applying conductivity to the surface is effective to improve the oxygen gas absorption performance, and providing a barrier layer such as the above-mentioned conductive layer to the surface is effective to restrain the migration. The barrier layer should have enough intensity against the volume change in the active material during a charge/discharge operation and be fine and uniform enough to restrain a soluble cadmium intermediate from dispersing outside the electrode.

Here, when a conductive layer comprising conductive powder and PVP, which is alkali-proof and oxidation resistant, is formed onto the surface of the active material layer, PVP and conductive powder form a hard, fine porous layer, which retains high intensity even in alkali electrolyte without swelling. Thus the conductive layer maintains its intensity without being damaged with the progress of charge/discharge cycle, whereby the oxygen gas absorption performance is maintained for a long period of time.

There is no other such water soluble binder than PVP. With polyvinyl alcohol (hereinafter referred to as PVA) or a cellulose derivative as a binder, for example, the conductive layer is swollen in alkaline electrolyte, decomposed by oxygen, or the binder itself is damaged by migration. On the other hand, with a water insoluble binder, toxicity and recovery of the organic solvent must be taken into consideration, which decreases the efficiency of the operation.

(2) The conductive layer comprising conductive powder and PVP is a porous layer having pores fine enough to block the passing of the active material and working also as conductive support of the active material. Therefore, the conductive layer can prevent the active material from deactivating and improve its utilization by working as the support. In addition, the porosity of the layer works to restrain the soluble intermediate, or the active material particles from dispersing outside the electrode, whereby migration can be restrained.

(3) PVP, which is excellent in dispersive property, binding property, and film-forming property, can easily disperse and mix conductive carbon powder or the like, so that there is no worry of decreasing the efficiency of the operation.

(4) The above construction requiring no nickel for the conductive layer can restrain the occurrence of hydrogen gas caused by hydrogen overvoltage, and accordingly, the sealed form of the cell can be protected from breaking.

Furthermore, if the conductive layer further includes fluororesin powder, the oxygen gas absorption performance is much more improved. This seems to result from the following:

Making the conductive layer have fluororesin particles and uniformly formed microscopic water repellent points inside allows much more boundaries of three phases containing oxygen as gas, electrolyte as liquid, and the electrode plate as solid to exist on the surface of the electrode. Thus, the easy access of oxygen gas to the surface accelerates the progress of reaction between metal cadmium and the oxygen gas.

If the cell further comprises a fluororesin layer being formed on the conductive layer, the oxygen gas absorption performance is further improved by the same reasons as above. In addition, its operation is further improved because of the following:

If fluororesin is added to a conductive layer forming solution comprising conductive powder such as carbon powder and a hydrophilic binder such as PVP, the solution might agglomerate, making it hard to be applied to the surface of the electrode. However, such agglomeration can be prevented by providing such layer containing fluororesin onto the conductive layer.

If the conductive layer includes PVA as another binder, the charge/discharge cycle characteristic under a high-rate discharge or a discharge at a low temperature is further improved because of the following:

When PVA is solely used as the binder of the conductive layer forming solution, the conductive layer is damaged in a short period as explained in Related Art. On the other hand, when PVA is used together with PVP, it can restrain both the coarsening of the active material and the accumulation of remaining cadmium, while retaining the film-forming property of PVP. Thus, the negative electrode is restrained from reducing its capacity. In addition, since the active material is coarsened especially under a high-rate discharge or a discharge at a low temperature, the cycle characteristic under these conditions can be further improved.

If the ratio of PVA to all the binders included in the conductive layer is between 0.05 and 0.5, the above-mentioned effects are emphasized.

When the ratio of PVA to all the binders is over 0.5, the film-forming property of PVP and its stability in alkaline electrolyte are spoiled, so that the amount of cadmium in the separator is increased, while the ratio is 0.05 or lower, the amount of PVA is not sufficient to prevent the coarsening of the active material, so that the cell capacity is diminished with the progress of charge/discharge cycle.

If the average molecular weight of PVP is 40,000 or more, the oxygen gas absorption performance and migration restraint effects are further improved because otherwise, each molecular would be given smaller capacity so that it is less bound to others, whereby the conductive layer is deteriorated in the repetition of charge/discharge cycle.

If PVP and the conductive powder are in the ratio between 2:8 and 8:2 in weight, the oxygen gas absorption performance and migration restraint effects are further improved because of the following:

When more PVP is mixed with the conductive powder, the intensity of the conductive layer is strengthened, but its conductivity is deteriorated because the powder is less bound with each other, and on the other hand, when more conductive powder than PVP is used, the results are the opposite.

If the conductive layer is formed at the ratio of 0.05 to 5 mg per 1 cm, on the surface of the active material layer, the increase in charge voltage and the decrease in discharge voltage can be restrained while improving the migration restraint effects because of the following:

Since enough intensity of the conductive layer can not be kept with too little amount, the layer is easily damaged and taken migration restraint effects by the stress accompanying the status change in the active material. To the contrary, when the amount is too much, the dispersion of the electrolyte is blocked and the polarization of the cell is grown.

If PVA is used as a binder contained in the active material layer, the cycle characteristic under a high-rate discharge or a discharge at a low temperature in which the negative electrode is easily damaged can be further improved because of the following:

PVA prevents the agglomeration and deactivation of the active material caused with the progress of the charge/discharge cycle, thereby restraining the accumulation of remaining cadmium.

In addition, if the cadmium negative electrode is left in the electrolyte containing kalium hydroxide without the execution of a charge/discharge operation, cadmium hydroxide crystal changes its phase from $\gamma$ to $\beta$ with the time passing. The $\gamma$ crystal is needle crystal of monoclinic system having large specific surface, while the $\beta$ crystal is large crystal of hexagonal system having smaller specific surface, so that such phase change lessens the utilization of the active material. However, PVA can effectively restrain this phase change and the deterioration of charging performance of the cell.

If PVA and a cellulosic water soluble polymer in the form of fine particles dispersed in the matrix of PVA are used as a binder contained the active material layer, the oxygen gas absorption performance is further improved because of the following:

With the binder having such construction, the film property of PVA is spoiled, still remaining the capability as a binder, so that the reaction between the oxygen gas and metal cadmium is freed from being hindered, thereby improving the oxygen gas absorption performance.

Such construction of the binder is obtained because both PVA and the polymer, when they are in the state of an aqueous solution, are in a phase of compatibility below separative threshold. However, the density of the solution gradually raises at the step of forming a dry film, exceeding the threshold and an out-mixture area where either PVA or the cellulosic water soluble polymer begins to precipitate, whereby a film is formed. Accordingly, the dry film does not have uniform phase.

In addition, adding the cellulosic water soluble polymer makes the effects of damaging the PVA film property be applied also to the surface of the electrode, so that much more active metal cadmium produced by a charging operation is exposed thereonto. Therefore, the effects of the conductive layer to improve the oxygen gas absorption performance is also appeared. More precisely, in the case where the cellulosic water soluble polymer is added and the conductive layer is formed, the effects of adding the cellulosic water soluble polymer is emphasized and the oxygen gas absorption performance is more improved than in the case where the cellulosic water soluble polymer is added and the conductive layer is not formed.

If the active material layer comprises fluororesin, the migration restraint effects are further improved because of the following:

Since the active material is supported by the fine mesh of fluororesin which is as thin as 1/10 of polyamide fiber, its volume change during a charge/discharge operation is restrained more effectively than by polyamide fiber. Accordingly, the soluble cadmium intermediate is restrained from dispersing, and the conductive layer is restrained from being damaged or losing satisfactory conditions of adhering to the electrode or the like, whereby the amount of migration is reduced.

In addition, since fluororesin is stable in alkali, unlike polyamide fiber, it never dissolve in the electrolyte to change into carbonate ion which helps migration.

If the fiber of the separator is polyolefine resin and the fiber has been applied with hydrophilic treatment, the oxygen gas absorption performance is further improved and the deterioration of the discharge performance of the cadmium electrode is restrained because of the following:

(1) PVP never swells or deteriorates in the alkaline electrolyte due to its alkali-proof, oxidation resistant characteristic, so that the combination of the negative electrode using PVP as a binder for the conductive layer and a separator applied with hydrophilic property such as PP separator never cause that the surface of the electrode is covered with electrolyte due to the swelling of the conductive layer. As a result, the boundaries of three phases convenient to absorb oxygen gas can be formed and retained on the surface of the electrode.

(2) A separator made from fiber processed with surface-active agent to avoid static electricity during spinning does not lose the surface-active agent on its surface unless water washing or the like is applied. The surface-active agent, which is known to work restraining agglomeration and accumulation of metal cadmium with the progress of the charge/discharge cycle, is dissolved or taken away from the fiber surface when the PP separator is applied with hydrophily process. This is because such hydrophily process requires some gas process or liquid process, the former causing the surface-active agent on the fiber surface to suffer from deposition reaction and the latter causing the agent to suffer from being dissolved in the electrolyte when PP fiber is soaked thereinto. As a result, the effects to restrain the deterioration of the discharge performance of the cadmium electrode is lost.

However, the inventors of this invention have found that using PVA as a binder added to the active material paste can be effective enough to restrain the agglomeration of the active material, or the accumulation of remaining cadmium. Thus the deterioration of the discharge performance of the cadmium electrode can be restrained according to the construction of this invention.

Although the same effects can be obtained by adding PVA to the conductive layer, the oxygen gas absorption performance is deteriorated if it is combined with a hydrophily-applied PP separator. Thus it is preferable to be added to the active material layer as the above-mentioned construction.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

Example 1

Figure 1:
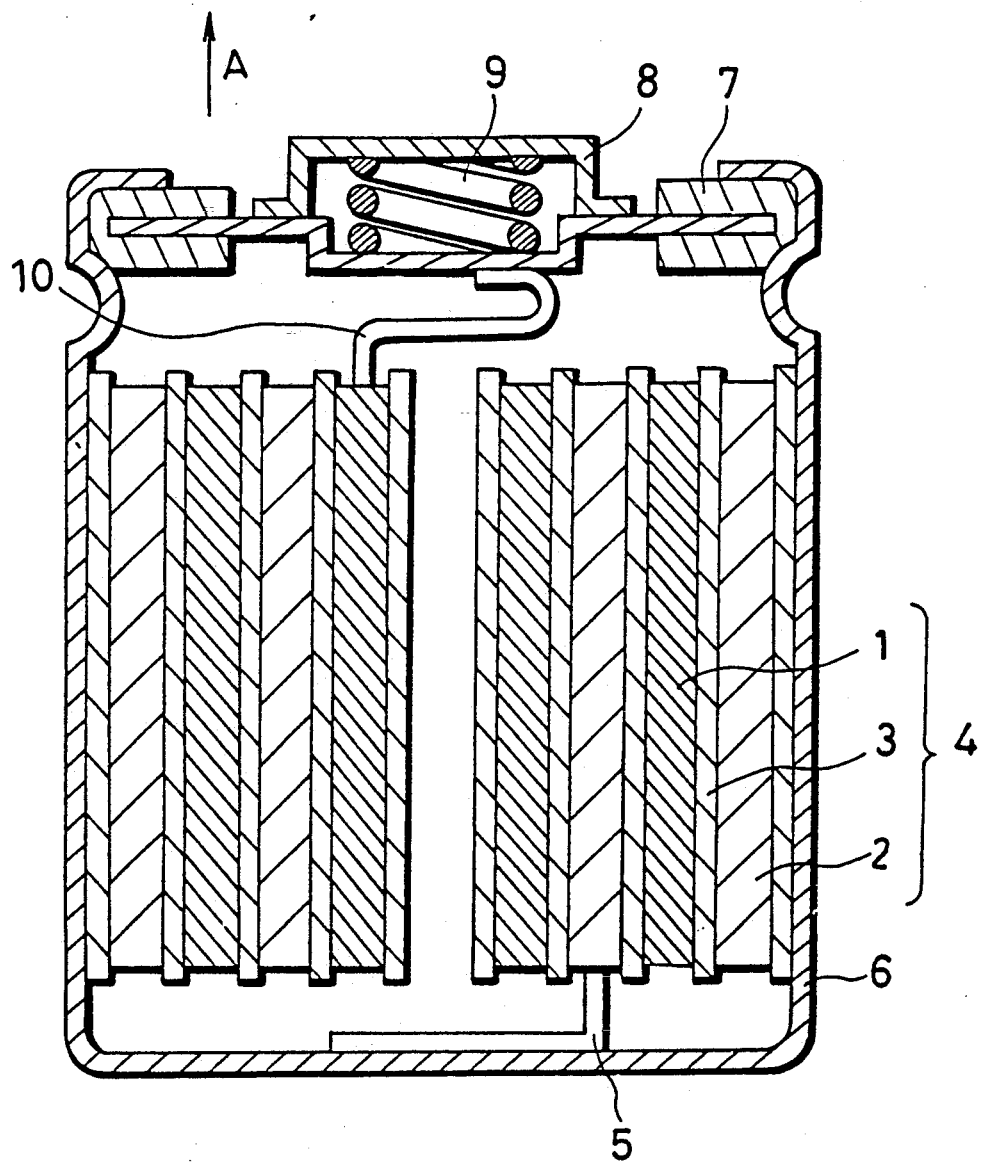
FIG. 1 is a sectional view of the sealed nickel-cadmium storage cell of an embodiment of this invention.

As shown in FIG. 1, the sealed nickel-cadmium storage cell of this example comprises a coiled electrode assembly 4 including a nickel sintered positive electrode 1, a negative electrode 2 mainly composed of cadmium oxide, and a separator 3 interposed therebetween. The negative electrode 2 consists of a conductive substrate, an active material layer provided thereon, and a conductive layer provided further thereon including PVP and conductive powder. The electrode assembly 4 is provided in a cell can 6 also acting as a negative terminal, the cell can 6 being connected with the negative electrode 2 through a conductive tab 5 for a negative electrode. The upper opening of the cell can 6 is covered with a sealing member 8, which is attached to the cell can 6 through a packing 7. A coiled spring 9 is disposed inside the sealing member 8. When the internal pressure of the cell gets abnormally high, the coiled spring 9 is pressed in a direction of an arrow A, whereby the gas inside is blown off outside. The sealing member 8 is connected with the positive electrode 1 through a conductive tab 10 for a positive electrode.

The alkaline storage cell having such construction was produced as follows:

First, active material paste was produced by kneading all of 80 wt % of cadmium oxide, 20 wt % of metal cadmium as active material, 1 wt % of nylon fiber, 1 wt % of sodium hydrogenphosphate as hydration inhibitor, and 20 wt % of an aqueous solution of 5% hydroxypropylcellulose (HPC) as a binder. This paste was applied to the conductive substrate having 0.08 mm thick, and then dried to produce a base electrode. Then, a conductive layer forming solution comprising 10 wt % of PVP as a binder, 10 wt % of acetylene black as a conductive agent, and 100 wt % of water was produced and applied to the surface of the base electrode and dried to produce a conductive layer onto the active material layer, whereby the negative electrode 2 was produced.

The negative electrode 2 thus produced, the nylon fiber nonwoven cloth separator 3, and the well-known nickel positive electrode 1 were coiled together to form the electrode assembly 4, which was then put inside the cell can 6. Then, the cell can 6 was supplied with electrolyte and covered with the sealing member 8. Thus a sealed nickel-cadmium storage cell whose official capacity was 1Ah was finally produced.

The cell thus produced is hereinafter referred to as Cell A.

Comparative Example 1

The cell of this example was produced in the same manner as in Example 1 above except that PVA was used as a binder for the conductive layer forming solution in place of PVP.

The cell thus produced is hereinafter referred to as Cell $Q_1$.

Comparative Example 2

The cell of this example was produced in the same manner as in Example 1 above except that no acetylene black was added to the conductive layer forming solution.

The cell thus produced is hereinafter referred to as Cell $Q_2$.

Comparative Example 3

The cell of this example was produced in the same manner as in Example 1 above except that no conductive layer was formed.

The cell thus produced is hereinafter referred to as Cell $Q_3$.

Table 1 below shows differences in ingredients of these cells.

TABLE 1

| | NEGATIVE ELECTRODE | |
|---|---|---|
| CELLS | binders for active material paste | binders for conductive layer forming solution |
| A | HPC | PVP |
| $Q_1$ | HPC | PVA |
| $Q_2$ | HPC | PVP (no acetylene black) |
| $Q_3$ | HPC | no conductive layer |

Experiment 1

Figure 2:
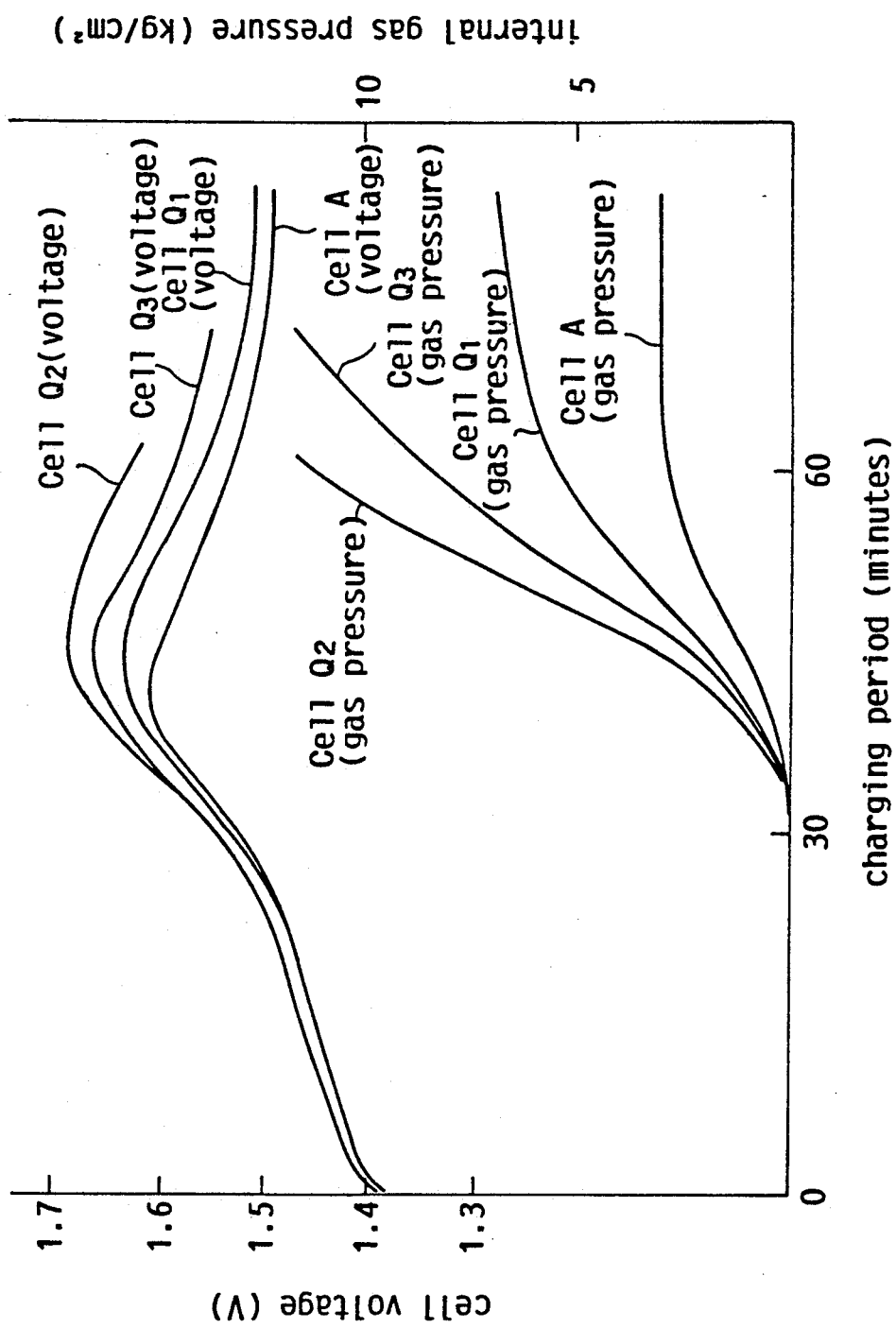
FIG. 2 is a graph showing the relationship between the charging hour, the gas pressure, and the voltage inside each of Cell A of this invention and Cells $Q_1$–$Q_3$ of the comparative examples in the 1st cycle of a charging operation.
Figure 3:
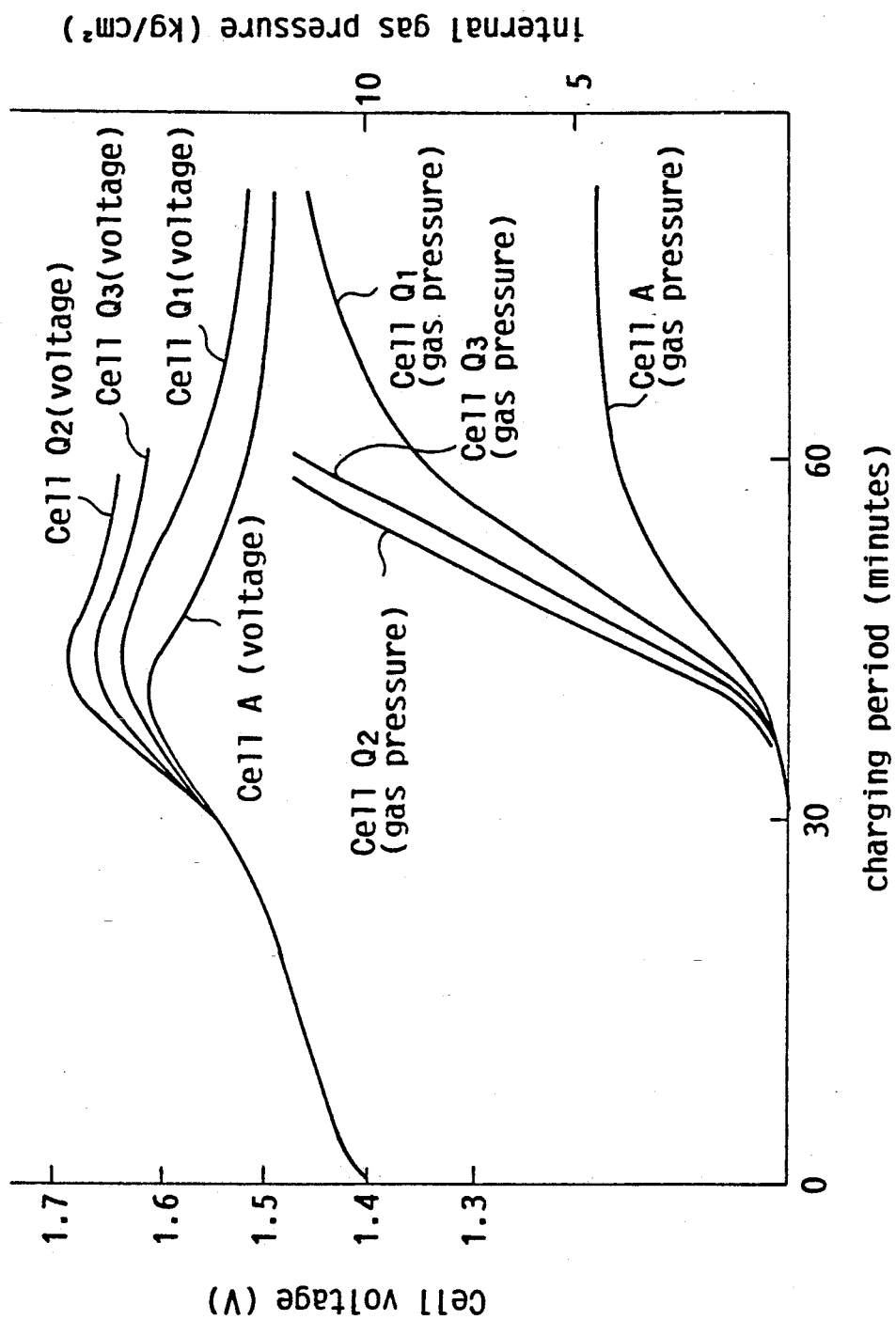
FIG. 3 is a graph showing the same relationship of each of the same cells as in FIG. 2 in the 20th cycle of a charging operation.

After charge/discharge operation of each of Cell A of this invention and Cells $Q_1$-$Q_3$ of the comparative examples was repeated, the gas pressure inside each cell and the cell voltage were measured. The results are shown in FIGS. 2 and 3. The charge/discharge cycle was as follows: first, a charging operation was carried out for about 50 minutes at 1.5 C of current, and then after 1 hour pause, a discharging operation was carried out at 1C of current until the voltage came down to 0.8 V, and then another 1 hour pause was taken.

FIG. 2 is a graph showing the change in the internal pressure of the cells and the like in the 1st cycle of a charging operation, and FIG. 3 is a graph showing the same in the 20th cycle of a charging operation.

As apparent from FIGS. 2 and 3, the raise of the gas pressure inside Cell A was smaller than those of Cells $Q_1$-$Q_3$ both in the 1st and the 20th cycles. It was confirmed that Cell A of this invention has excellent oxygen gas absorption performance, compared with Cells $Q_1$-$Q_3$ of the comparative examples.

Such differences in oxygen gas absorption performance seems to result from the following:

Since Cell $Q_2$ has no conductive material (carbon powder) in the conductive layer forming solution and Cell $Q_3$ has no conductive layer itself, they have to absorb oxygen gas almost exclusively from the vicinity of the substrate of the negative electrode.

Since Cell $Q_1$ uses PVA, which swells much more rapidly than PVP in alkaline electrolyte, it works less effective to form and hold boundaries of three phases on the surface of the electrode. Such swelling develops further in the progress of the charge/discharge cycle, and at the same time, particles of carbon powder get far apart from each other, whereby the conductivity of the surface of the electrode is deteriorated. Thus, the difference in the gas pressure between Cell A and Cells $Q_1$–$Q_3$ grow in the progress of the charge/discharge cycle.

Experiment 2

After charge/discharge operation of each of Cell A of this invention and Cells $Q_1$–$Q_3$ of the comparative examples was repeated, the relationship between the cycle number and each of the amount of cadmium inside the separator and the discharge capacity were measured. These results are shown in FIGS. 4 and 5 respectively.

The charge/discharge cycle was as follows: first, a charging operation was carried out at 1C of current under $-\Delta V$ detection (the charging operation is terminated at a point that the charging voltage dropped by a certain value from the peak voltage in the final period of the charging operation), and then after 1 hour pause, a discharging operation was carried out at 1C of current until the voltage came down to 0.8 V. Each separator was taken out of each cell in every predetermined cycle, and cadmium was abstracted therefrom with the use of hydrochloric acid and measured by atomic absorption spectro photometry.

Figure 4:
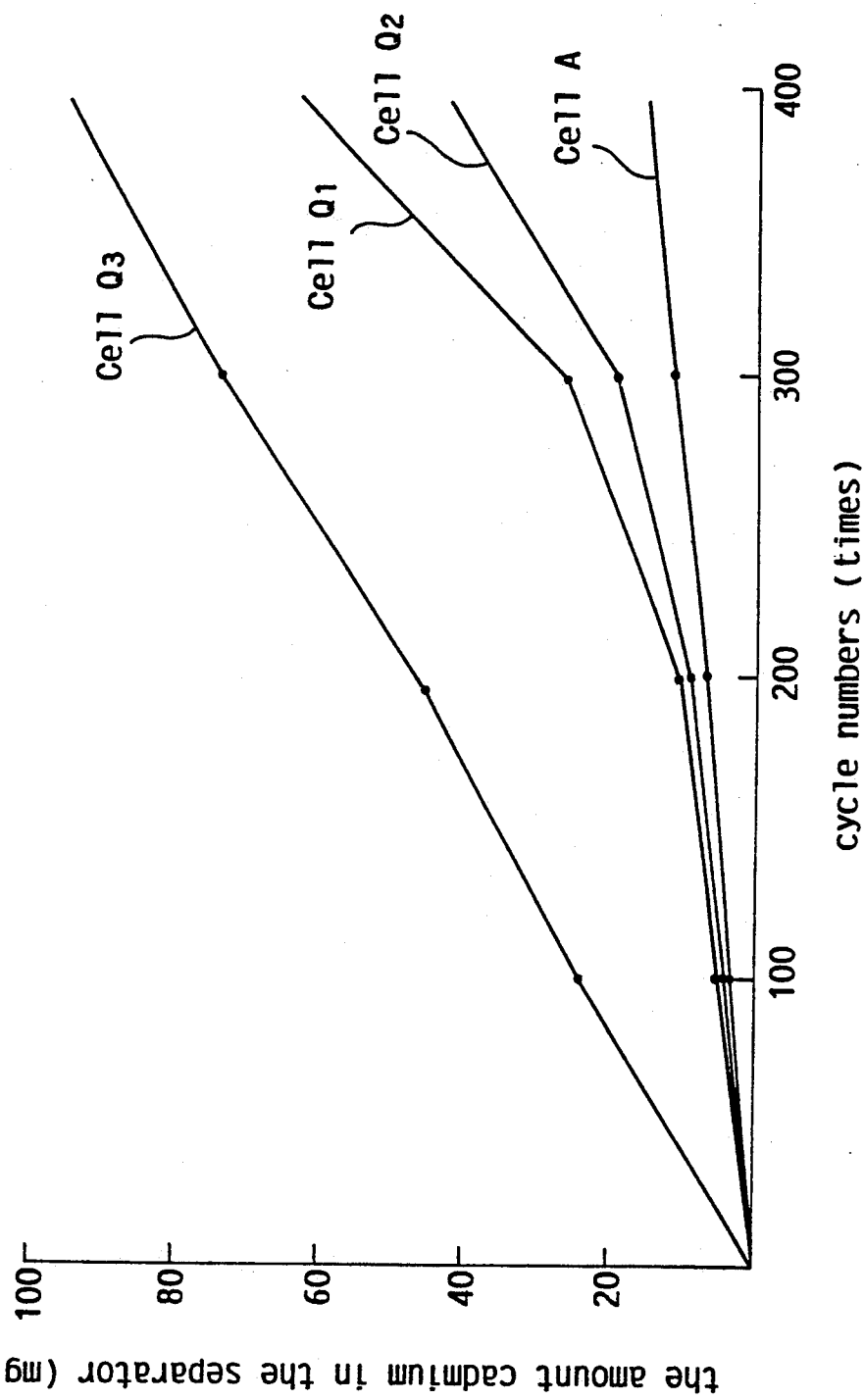
FIG. 4 is a graph showing the relationship between the charge/discharge cycle numbers and the amount of cadmium in the separator of each of the same cells as in FIG. 2.
Figure 5:
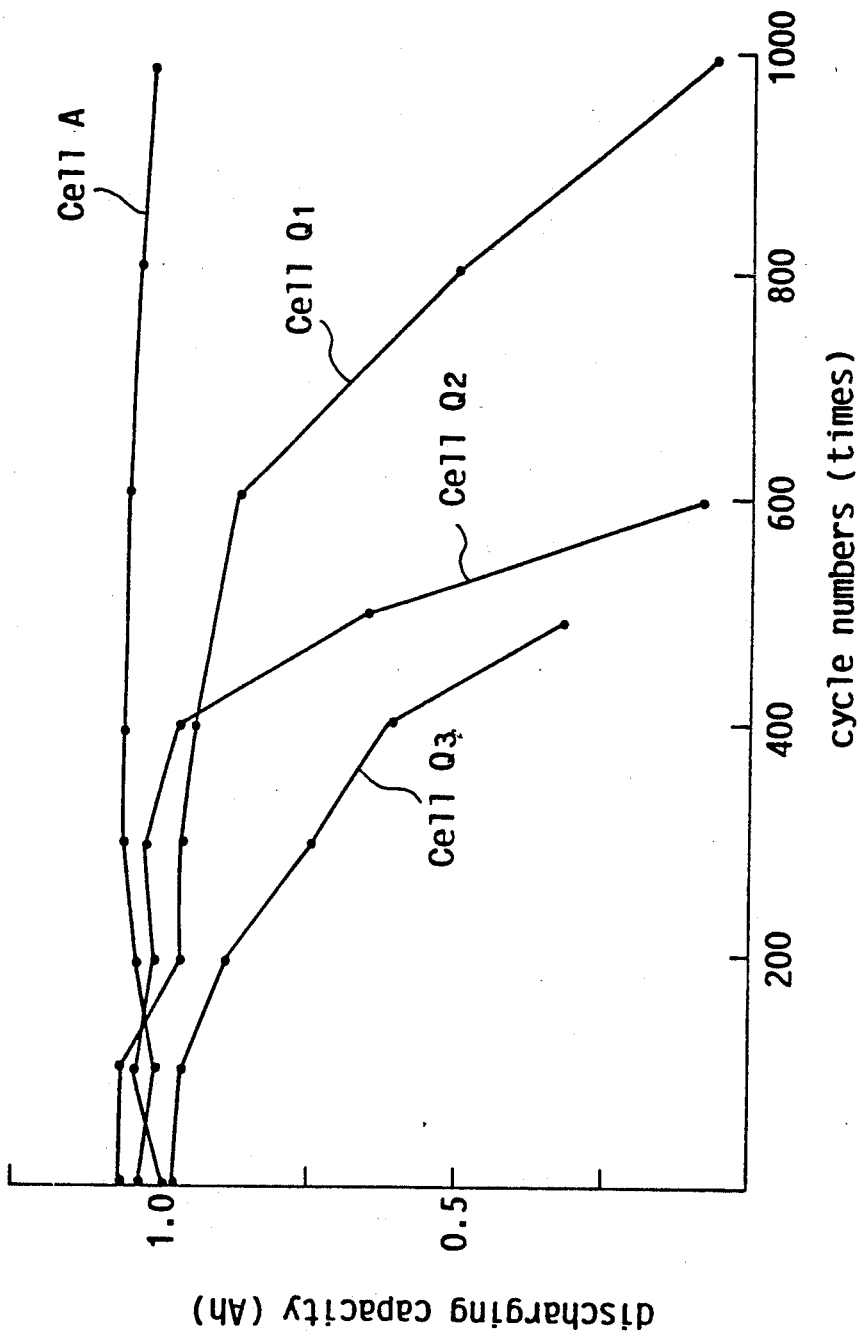
FIG. 5 is a graph showing the cycle characteristic of each of the same cells as in FIG. 2.

As apparent from FIG. 4, in Cell $Q_3$ having no conductive layer, the amount of cadmium grew in a beeline with the progress of the charge/discharge cycle, while in Cells A, $Q_1$, and $Q_2$ each having a negative electrode with a conductive layer including either PVP or PVA as a binder, the increase was restrained until the 200th cycle. This seems to result from that the conductive layer formed on the surface of the negative electrode functioned as a barrier layer to block the dispersion of cadmium soluble intermediate to the outside of the electrode.

However, in Cells $Q_1$ and $Q_2$, the amount of cadmium began to increase rapidly after the 200th cycle, unlike in Cell A where it remains the same. This seems to result from the following:

In Cell $Q_1$ using PVA as a binder, the conductive layer containing PVA swells pretty soon in the electrolyte, losing the function as the barrier layer. In Cell $Q_2$ whose conductive layer contains no carbon powder, the PVP film is formed so fine that the dispersion of the electrolyte is blocked. This causes polarization of the electrode during the charge/discharge reaction. In addition, such a fine film protecting the active material particles is damaged by the internal pressure occurring according to the status change of the active material, not functioning as the barrier layer any more. To the contrary, in Cell A having PVP not easily swell, the function as the barrier layer can be retained for a long period of time.

Experiment 3

The cycle characteristic of each of Cell A of this invention and Cells $Q_1$–$Q_3$ of the comparative examples were measured, and the results are shown in FIG. 5. The charge/discharge operation was conducted under the same conditions as in Experiment 2.

As apparent from FIG. 5, in Cell A, the discharging capacity remained almost the same even in the 1000th cycle. To the contrary, it suddenly diminished in about the 600th in Cell $Q_1$ and in the 400th cycle in $Q_2$ and $Q_3$.

Then these four cells were broken down to compare their internal conditions. As a result, migration was observed only in Cells $Q_1$ and $Q_3$, which proved that the sudden decrease in the discharging capacity resulted from internal short-circuit due to migration. Also, leakage of the electrolyte through the safety valve was observed in Cell $Q_2$. Such leakage seems to result from the electrolyte being released together with oxygen gas by the raise of the internal pressure of the cell when the oxygen gas absorption performance was deteriorated, and as a consequence, the electrolyte in the cell runs short and its concentration changes, whereby the cycle characteristic was deteriorated.

Embodiment 2

Example 1

The cell of this example was produced in the same manner as in Example 1 of Embodiment 1 except that 100 wt % of a 10 wt % Teflon aqueous solution (Du Pont-Mitsui Fluorochemicals Co., Ltd. fluororesin dispersion 30-J) was used in place of 100 wt % of water in producing the conductive layer forming solution.

The cell thus produced is hereinafter referred to as Cell B.

Comparative Example 1

The cell of this example was produced in the same manner as in Example 1 of Embodiment 2 except that the same amount of PVA was used in place of PVP in producing the conductive layer forming solution.

The cell thus produced is hereinafter referred to as Cell R.

Comparative Example 2

Cell $Q_3$ of Comparative example 3 of Embodiment 1 was used as the cell of this example.

Table 2 below shows differences in the ingredients of these cells.

TABLE 2

| | NEGATIVE ELECTRODE | |
|---|---|---|
| CELLS | binders for active material paste | binders for the conductive layer forming solution |
| B | HPC | PVP (including fluororesin) |
| R | HPC | PVA (including fluororesin) |
| $Q_3$ | HPC | no conductive layer |

Experiment

Figure 6:
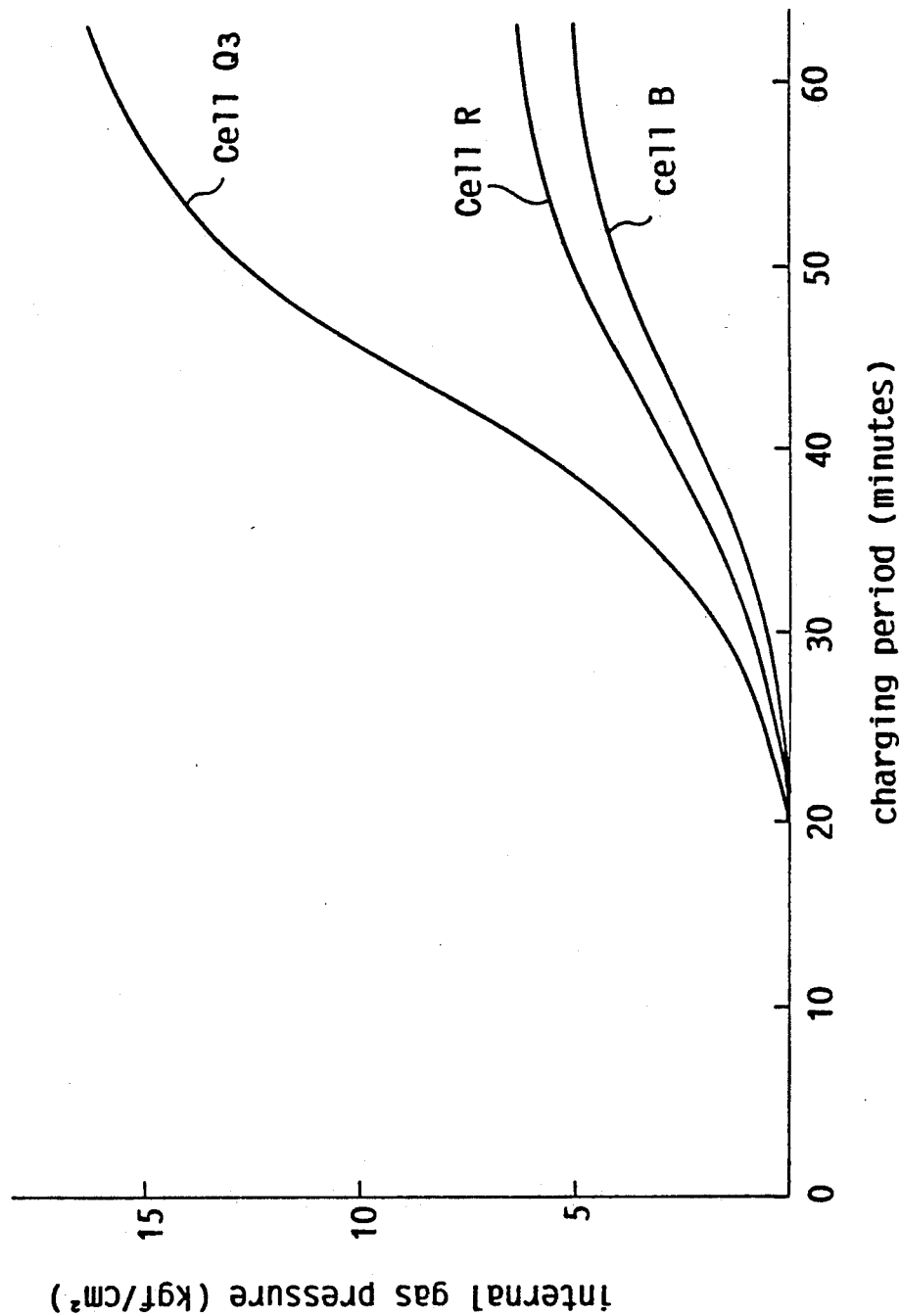
FIG. 6 is a graph showing the relationship between the charging hour and the gas pressure inside each of Cell B of this invention as well as Cells R and $Q_3$ of the comparative examples in the 1st cycle of a charging operation.
Figure 7:
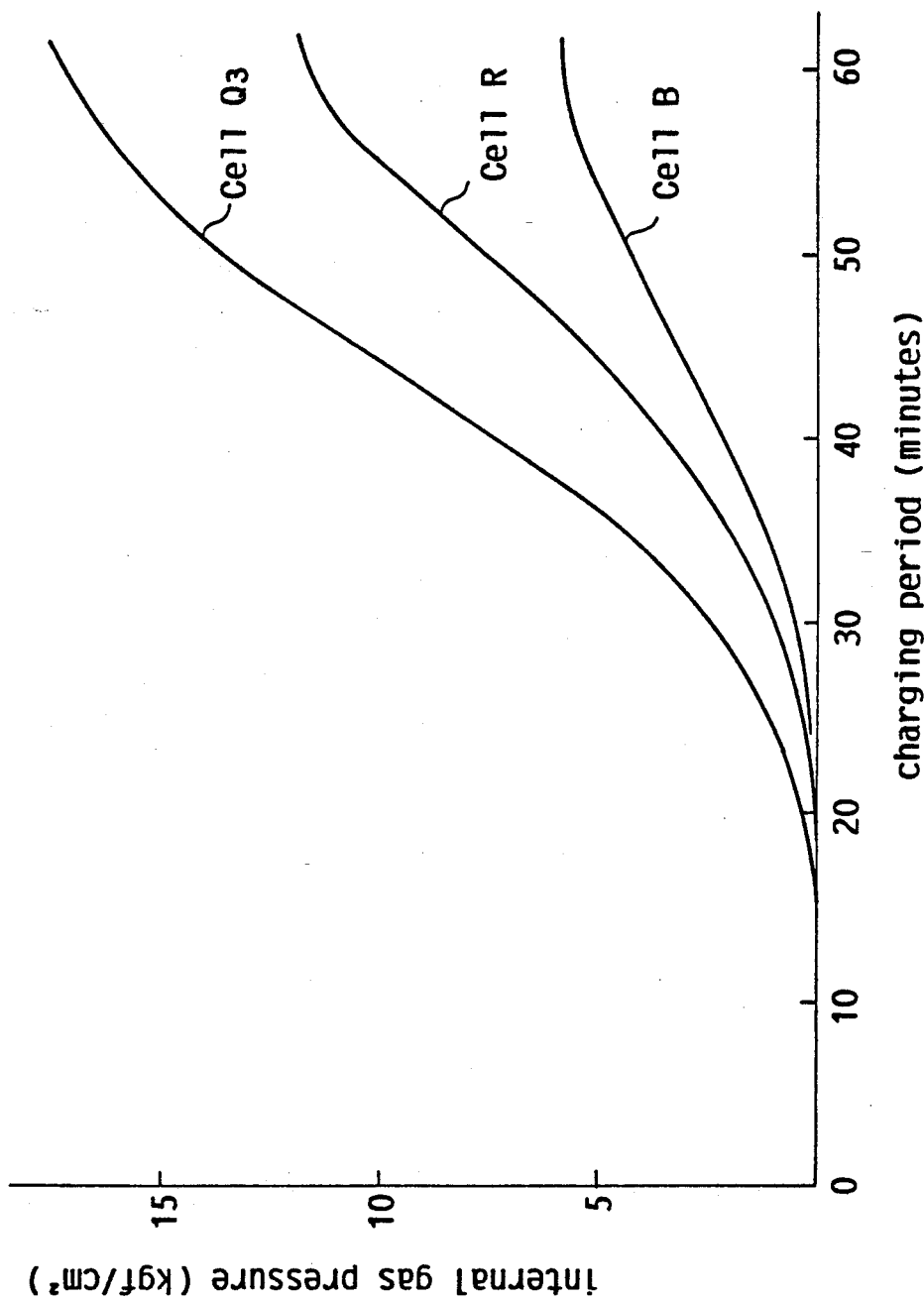
FIG. 7 is a graph showing the same relationship of each of the same cells as in FIG. 6 in the 30th cycle of a charging operation.

After charge/discharge operation of each of Cell B of this invention and Cells R and $Q_3$ of the comparative examples was repeated, the gas pressure inside each cell was measured. The results are shown in FIGS. 6 and 7. The charge/discharge cycle was as follows: first, a charging operation was carried out at 1C of current up to the full, then after 1 hour pause, a discharging operation was carried out at 1C of current until the voltage came down to 0.8 V, and another 1 hour pause was taken. The charging current at the point the internal pressure was being measured was 2C. FIGS. 6 and 7 show the internal pressure of the cells respectively in the 1st and the 30th cycle of a charging operation.

As apparent form FIGS. 6 and 7, Cell $Q_3$ having no conductive layer has poor oxygen gas absorption performance from the beginning of the cycle. Although Cell R using PVA as a binder for the conductive layer showed as good absorption performance as Cell B of this invention at the beginning of the cycle, it greatly decreased in the 30th cycle. To the contrary Cell B using PVP did not lose its excellent oxygen gas absorption performance even after the 30th cycle.

These difference in the oxygen gas absorption performance seems to result from the following:

In Cell $Q_3$ having no conductive layer, metal cadmium arises almost exclusively in the vicinity of the substrate. In Cell R, PVA swells in the alkaline electrolyte during the charge/discharge cycle, so that each particle of carbon powder gets far apart from others, whereby the conductivity of the surface of the electrode is decreased. To the contrary, In Cell B of this invention, swelling or decomposition of PVP by the electrolyte is never caused thanks to its alkali-proof property, so that the conductivity of acetylene black and the hydrophobic property of fluororesin can be maintained.

In addition, in Cell B having a conductive layer containing fluororesin with hydrophobic property, it becomes easier to form boundaries of three phases containing oxygen as gas, electrolyte as liquid, and the electrode plate as solid. Thus Cell B can obtain more excellent oxygen gas absorption performance than Cell A of Embodiment 1.

Embodiment 3

Example 1

The cell of this example was produced in the same manner as in Example 1 of Embodiment 1 except that the negative electrode was soaked in a 10 wt % Teflon aqueous solution (Du Pont-Mitsui Fluorochemicals Co., Ltd. fluororesin dispersion 30-J) after the conductive layer was produced.

The cell thus produced is hereinafter referred to as Cell C.

Comparative Example 1

The cell of this example was produced in the same manner as Comparative example 1 of Embodiment 1 except that the negative electrode was soaked in a 10 wt % Teflon aqueous solution (Du Pont-Mitsui Fluorochemicals Co., Ltd. fluororesin dispersion 30-J) after the conductive layer was produced. The binder for the conductive layer only is different from Example 1 above of this embodiment.

The cell thus produced is hereinafter referred to as Cell S.

Comparative Example 2

Cell $Q_3$ of Comparative example 3 of Embodiment 1 was used as the cell of this example.

Table 3 below shows differences in the ingredients of these cells.

TABLE 3

| CELLS | NEGATIVE ELECTRODE | |
|---|---|---|
| | binders for active material paste | binders for the conductive layer forming solution |
| C | HPC | PVP (with fluororesin coated on the conductive layer) |
| S | HPC | PVA (with fluororesin coated on the conductive layer) |
| $Q_3$ | HPC | no conductive layer |

Experiment

Figure 8:
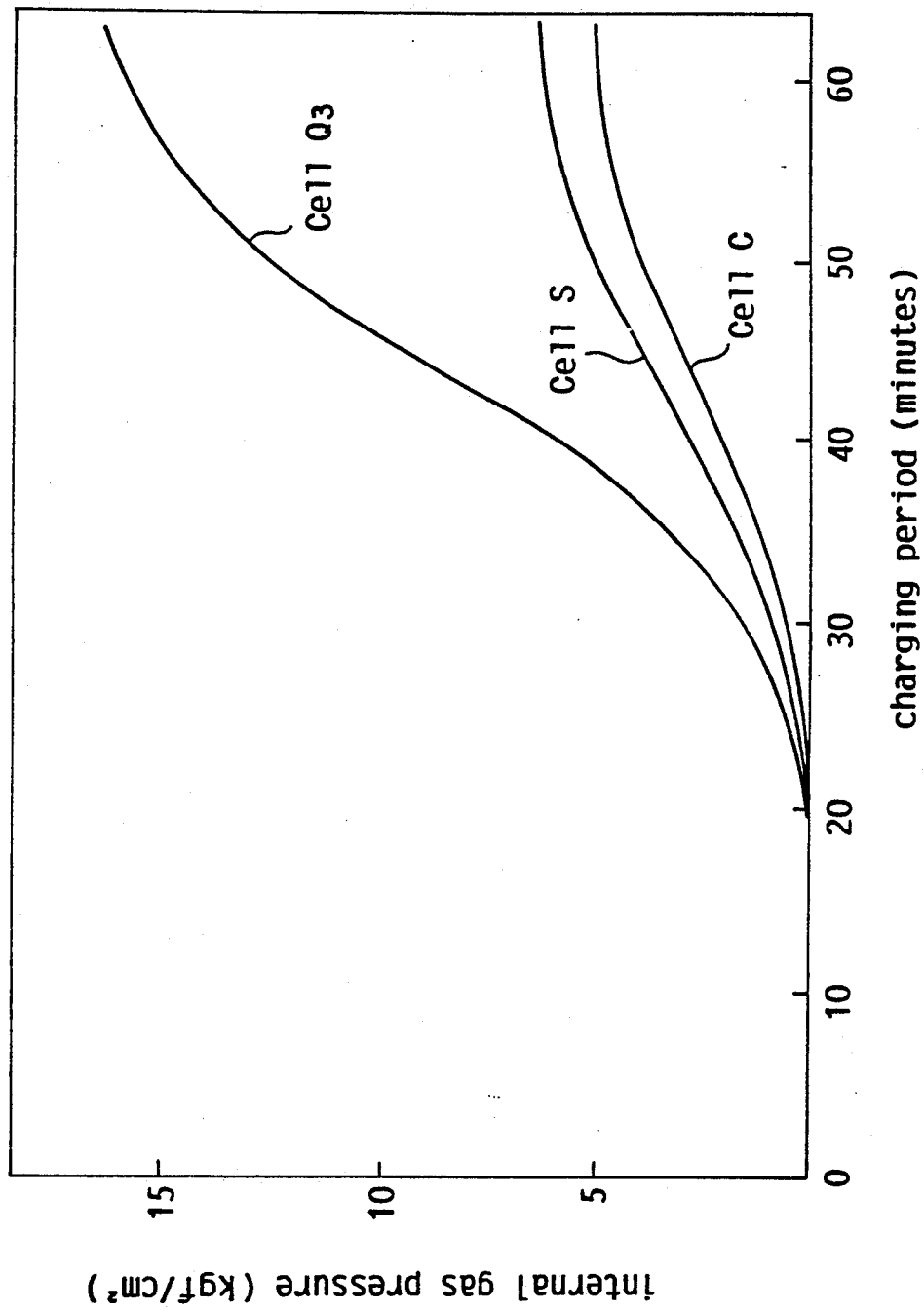
FIG. 8 is a graph showing the relationship between the charging hour and the gas pressure inside each of Cell C of this invention as well as Cells S and $Q_3$ of the comparative examples in the 1st cycle of a charging operation.
Figure 9:
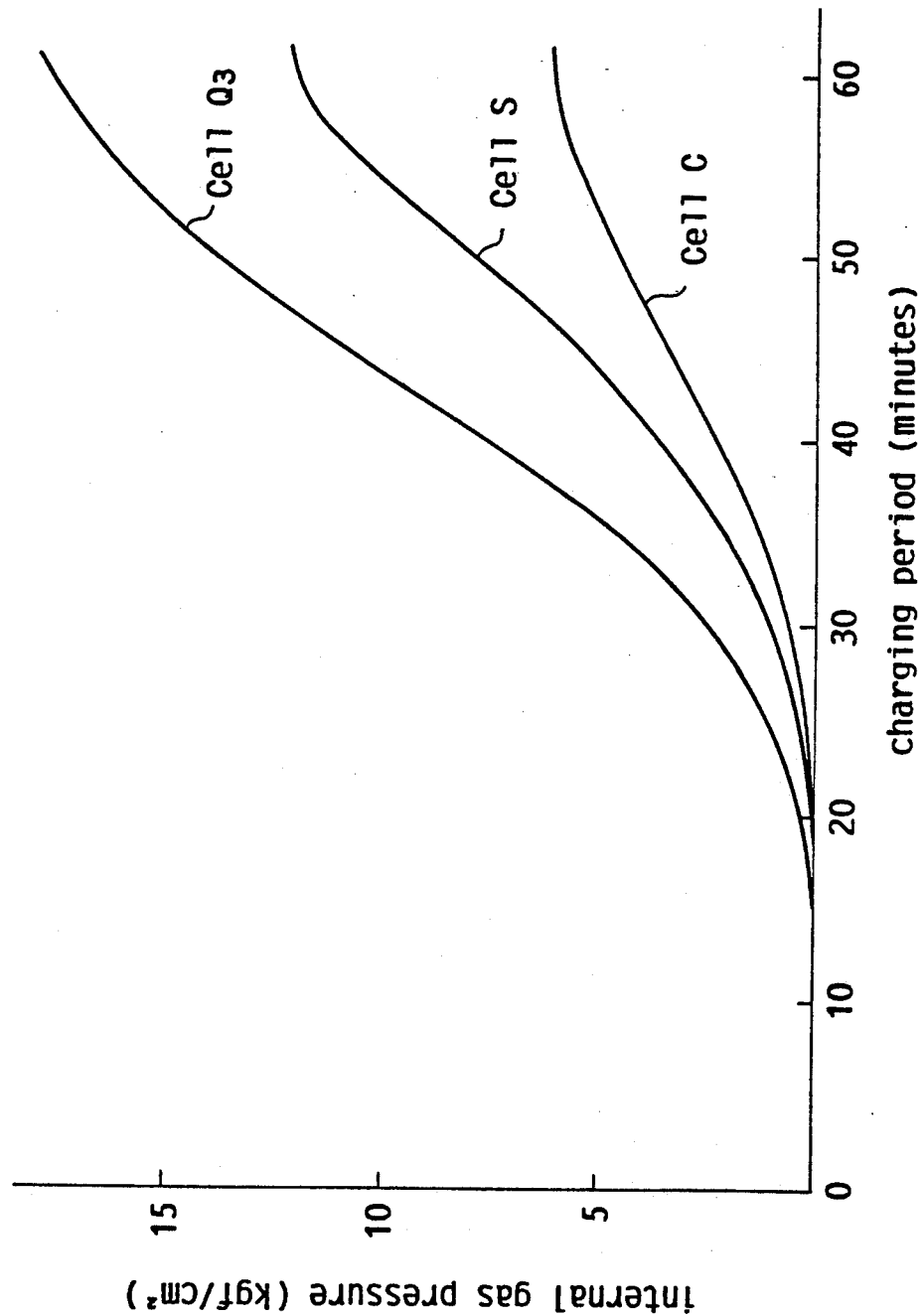
FIG. 9 is a graph showing the same relationship of each of the same cells as in FIG. 8 in the 30th cycle of a charging operation.

After charge/discharge operation of each of Cell C of this invention and Cells S and $Q_3$ of the comparative examples was repeated, the gas pressure inside each cell was measured. The results are shown in FIGS. 8 and 9. The charge/discharge cycle was as follows: first, a charging operation was carried out at 1C of current up to the full, then after 1 hour pause, a discharging operation was carried out at 1C current until the voltage comes down to 0.8 V, and another 1 hour pause was taken. The charging current at the point the internal pressure was being measured was 2C.

As apparent from FIGS. 8 and 9, Cell $Q_3$ having no conductive layer had poor oxygen gas absorption performance from the beginning of the cycle. Although Cell S using PVA as a binder for the conductive layer showed as good absorption performance as Cell C of this invention at the beginning of the cycle, it greatly dropped at the 30th cycle. To the contrary, Cell C using PVP did not lose its excellent oxygen gas absorption performance even after the 30th cycle. These difference in the oxygen gas absorption performance seems to result from the same as described in Experiment of Embodiment 2.

Embodiment 4

Example 1

The cell of this example was produced in the same manner as in Example 1 of Embodiment 1 except that the amount of PVP was reduced from 10 wt % to 8 wt %, and 2 wt % of PVA was added.

The cell thus produced is hereinafter referred to as Cell D.

Example 2

Cell A of Example 1 of Embodiment 1 was used as the cell of this example.

Comparative Example

Cell $Q_1$ of Comparative example 1 of Embodiment 1 was used as the cell of this example.

Table 4 below shows differences in the ingredients of these cells.

TABLE 4

| CELLS | NEGATIVE ELECTRODE | |
|---|---|---|
| | binders for active material paste | binders for the conductive layer forming solution |
| D | HPC | PVA + PVP |
| A | HPC | PVP |
| $Q_1$ | HPC | PVA |

Experiment 1

Figure 10:
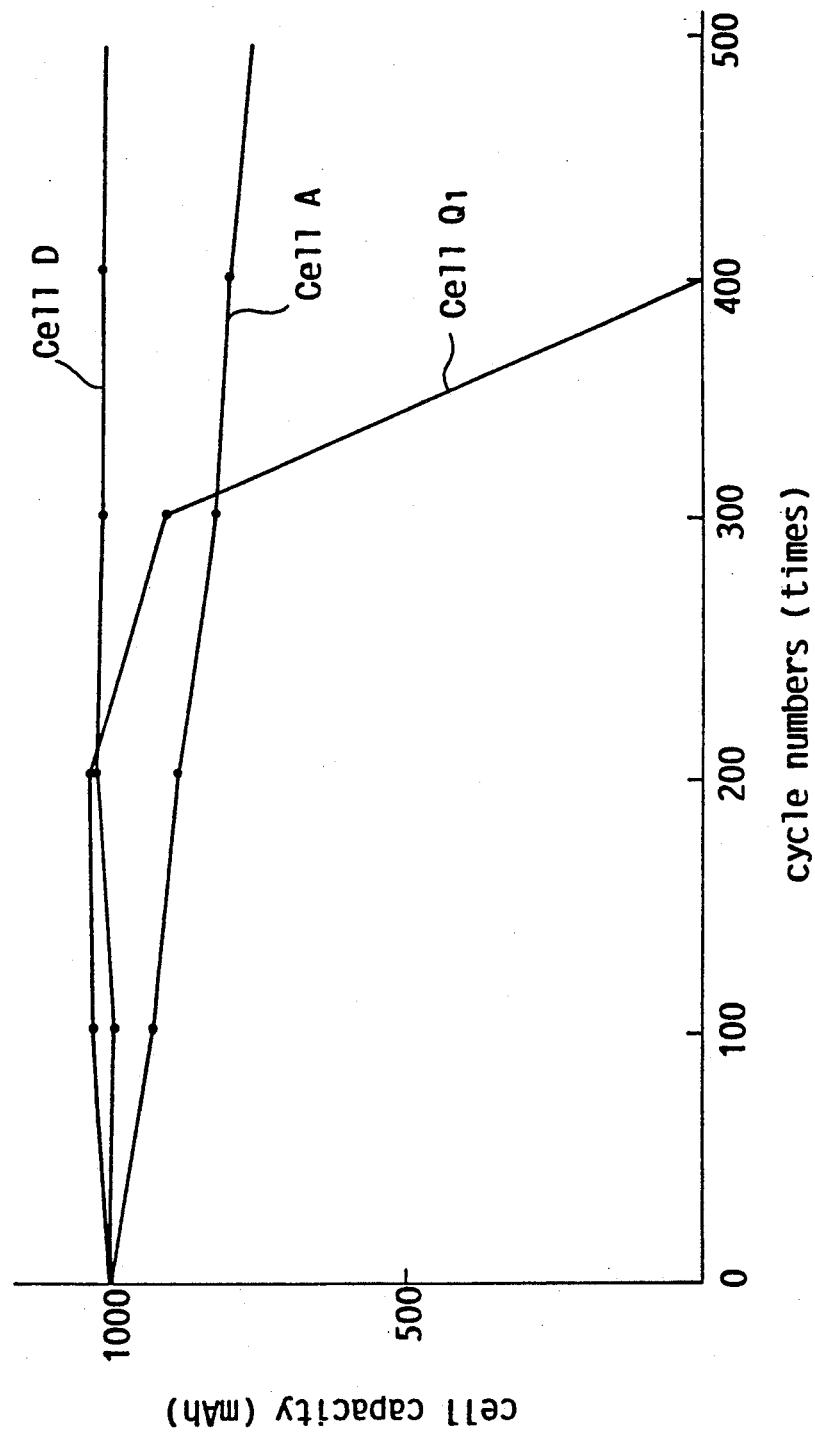
FIG. 10 is a graph showing the cycle characteristic of each of Cell A of this invention as well as Cells D and $Q_1$ of the comparative examples.

The cycle characteristic of each of Cell A and D of this invention and Cell $Q_1$ of the comparative example were measured, and the results are shown in FIG. 10. The charge/discharge cycle was as follows: first, a charging operation was carried out for 16 hours at 0.1C of current, then after 1 hour pause, a discharging operation was carried out at 4C of current until the voltage came down to 0.8 V, and another 1 hour pause was taken.

As apparent from FIG. 10, in Cell $Q_1$, the cell capacity dropped suddenly in the 200-300th cycle, the cell life ending completely at the 400th cycle. On the other hand, in Cell A of this invention, the cell capacity did not dwindle so rapidly but began to decrease gradually with the progress of the cycle, and in Cell D, the initial capacity was maintained even in the 500th cycle.

Then these three cells were broken down and migration was observed only in Cell $Q_1$, which proved that the sudden decrease in cycle characteristic resulted from internal short-circuit due to the migration.

However, in Cell A, the particles of the active material were agglomerated or coarsened unlike Cell D. This seems to prove that the utilization of the active material was lessened in the repetition of the charge/discharge cycle in Cell A, thereby deteriorating the cycle characteristic. Thus, it is desirable to add some PVA besides PVP in producing the conductive layer forming solution to effectively avoid the agglomeration or coarsening of the active material.

Experiment 2

Figure 11:
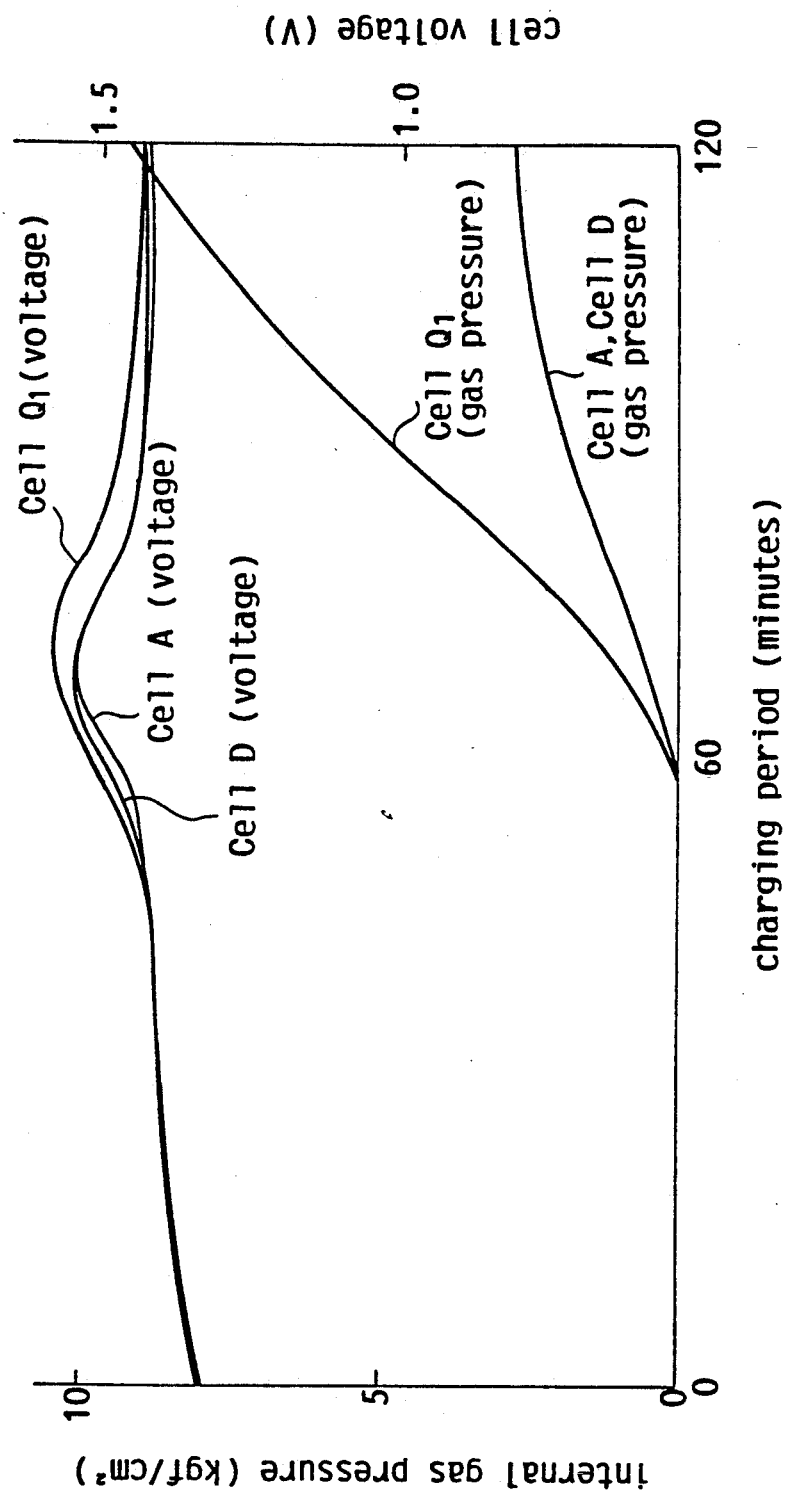
FIG. 11 is a graph showing the relationship between the charging hour, the gas pressure, and the cell voltage inside each of the same cell as in FIG. 10, in the 30th cycle of a charging operation.

The charge/discharge operation of each of Cells A and D of this invention and Cell $Q_1$ of the comparative example was repeated until the 30th cycle, and then the gas pressure inside each cell was measured. The results are shown in FIG. 11. The charge/discharge cycle conditions were the same as in Experiment 1. The charging operation at the point the internal pressure was being measured was carried out for 2 hours at 1C of current.

As apparent from FIG. 11, the raise of the internal gas pressure of Cells A and D of this invention is small, compared with that of Cell Q.

Such difference in the internal gas pressure seems to result from the same as mentioned in Experiment 1 of Embodiment 1. Considering that Cells A and D have the same internal gas pressure each other, it proves that the preferable filming function of PVP never be lost by adding a predetermined amount of PVA.

Experiment 3

According to Example 1 of this embodiment, 12 different negative electrodes were produced which included PVA and PVP in the ratio between 99:1 and 30:70, and then 12 different cells using each of these electrodes were produced. After the charge/discharge cycle of each of these cells was repeated 300 times, the amount of cadmium transferred into the separator and the cell capacity were measured. These results are respectively shown in FIGS. 12 and 13. The cell capacity was measured under the same conditions as in Experiment 1. The cadmium thus transferred was measured by atomic absorption spectro photometry after breaking down each cell, taking the separator out of it, abstracting cadmium from the separator with the use of hydrochloric acid. The ratio of PVA and PVP in each cell is shown in Table 5 below.

TABLE 5

| PVP | 99 | 98 | 97 | 96 | 95 | 90 | 80 | 70 | 60 | 50 | 40 | 30 |
|-----|----|----|----|----|----|----|----|----|----|----|----|----|
| PVA | 1  | 2  | 3  | 4  | 5  | 10 | 20 | 30 | 40 | 50 | 60 | 70 |

Figure 12:
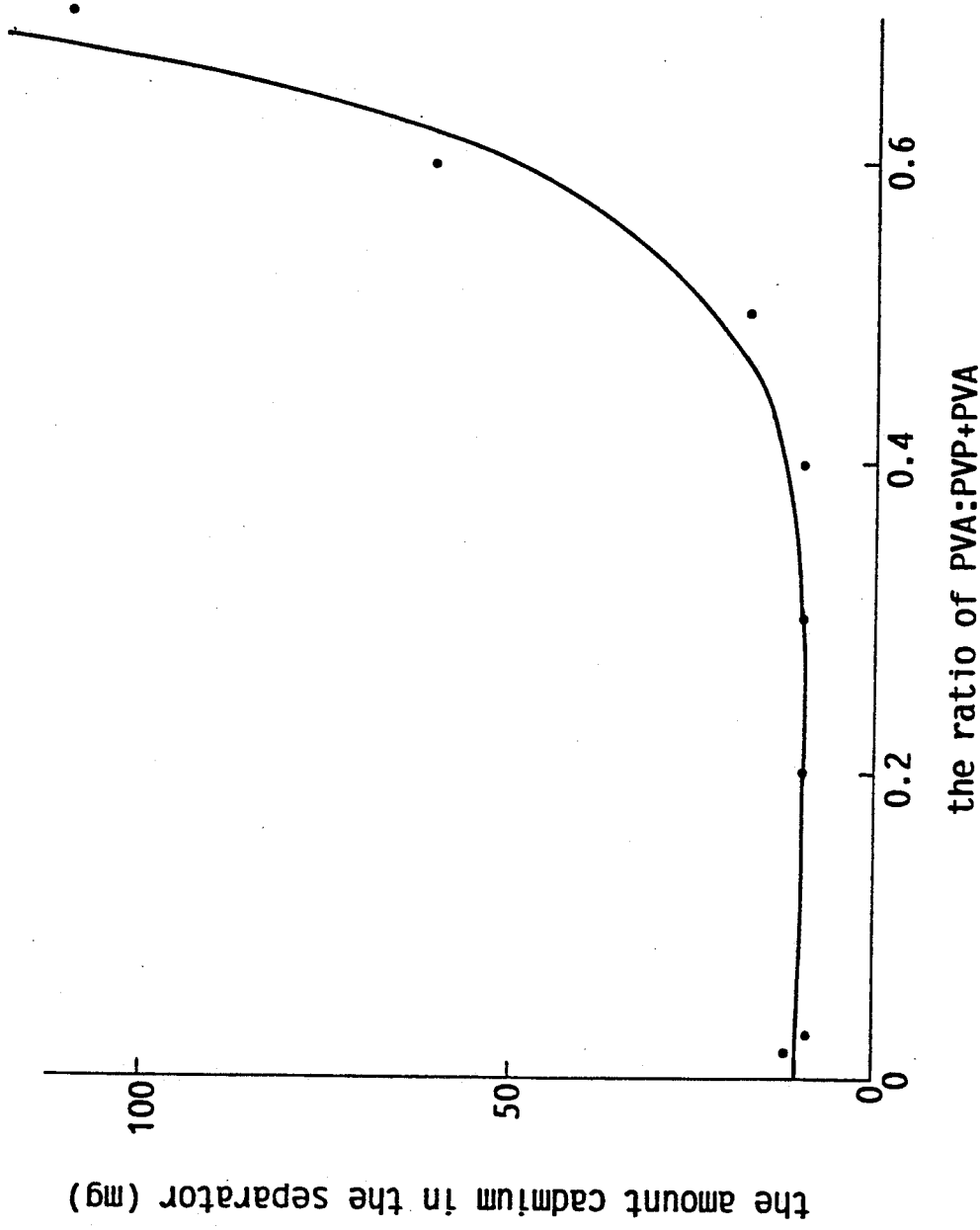
FIG. 12 is a graph showing the relationship between the ratio of PVA and PVP+PVA, and the amount of cadmium in the separator.

As apparent from FIG. 12, the amount of cadmium in the separator grew rapidly when the ratio of PVA and PVP+PVA exceeded 0.5. This seems to result from that the growing PVA spoiled the film-forming property of PVP and its stability in an alkaline electrolyte. Accordingly, the preferable ratio of PVA and PVP+PVA in order to maintain the good film-forming property is 0.5 or less.

Figure 13:
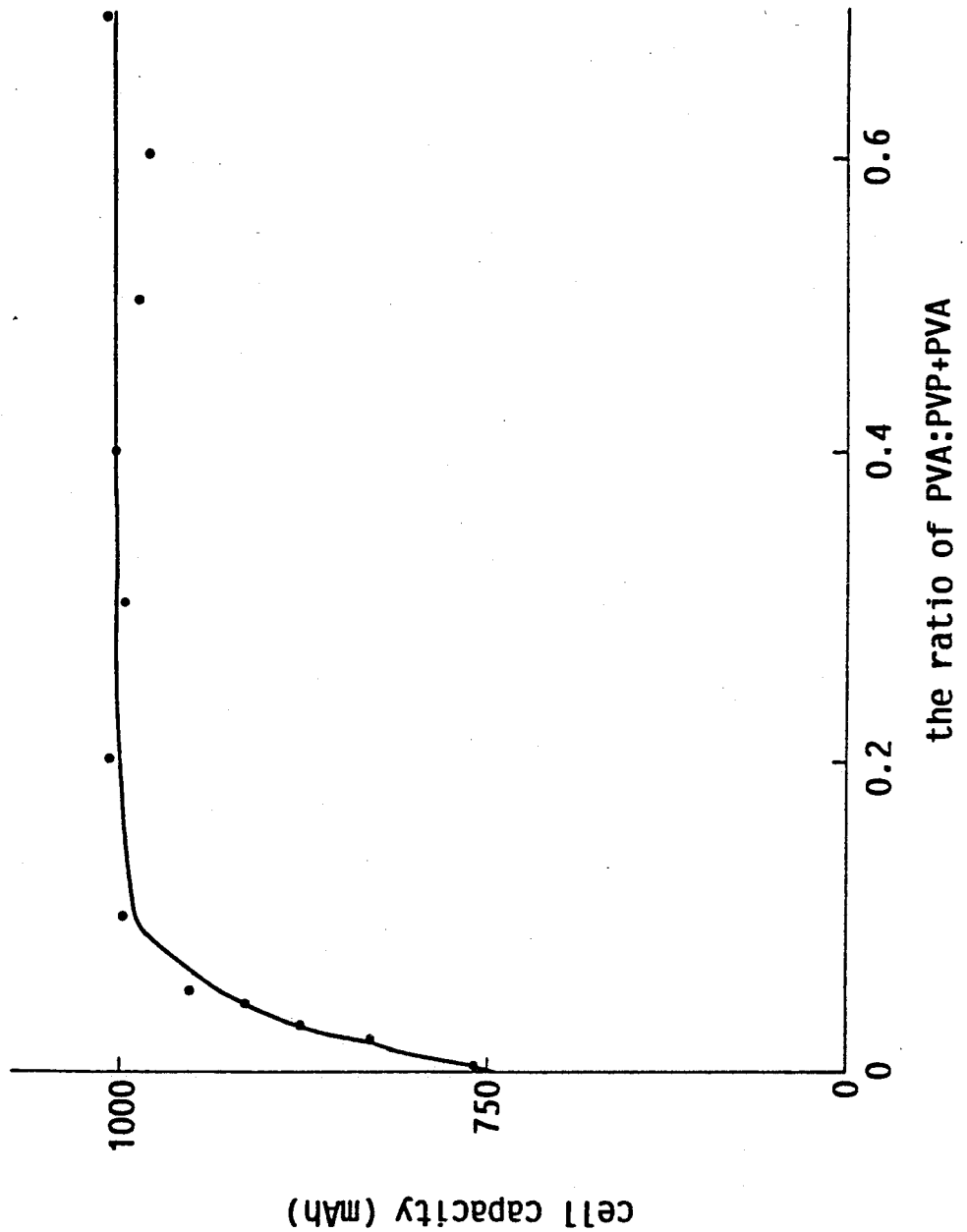
FIG. 13 is a graph showing the relationship between the ratio of PVA and PVP+PVA, and the cell capacity.

On the other hand, as apparent from FIG. 13, the cell capacity suddenly reduced when the ratio of PVA and PVP+PVA was 0.05 or lower, which seems to result from that too little PVA can not effect to avoid the coarsening of the active material any more. Accordingly, the preferable ratio of PVA and PVP+PVA is between 0.05 and 0.5.

Embodiment 5

Examples 1-3

The cells of these examples were produced in the same manner as Example 1 of Embodiment 1 except that the average molecular weight of PVP used for the conductive layer forming solution were 360,000, 100,000, and 40,000 respectively. In these cells, the weight ratio of PVP and acetylene black was 1:1, and the amount of them applied on the conductive layer was 0.6mg per 1 cm$^2$.

The cells thus produced are hereinafter referred to as Cells $E_1$-$E_3$.

Examples 4 and 5

The cells of these examples were produced in the same manner as Examples 1-3 above except that the average molecular weight of PVP used for the conductive layer forming solution were 10,000 and 3,000 respectively.

The cells thus produced are hereinafter referred to as Cells $E_4$ and $E_5$ respectively.

Table 6 below shows differences in the ingredients of these cells.

TABLE 6

| | NEGATIVE ELECTRODE | |
|---|---|---|
| CELLS | binders for active material paste | binders for the conductive layer forming solution (Average molecular weight) |
| $E_1$ | HPC | PVA (360,000) |
| $E_2$ | HPC | PVA (100,000) |
| $E_3$ | HPC | PVA (40,000) |
| $E_4$ | HPC | PVA (10,000) |
| $E_5$ | HPC | PVA (3,000) |

Experiment 1

Figure 14:
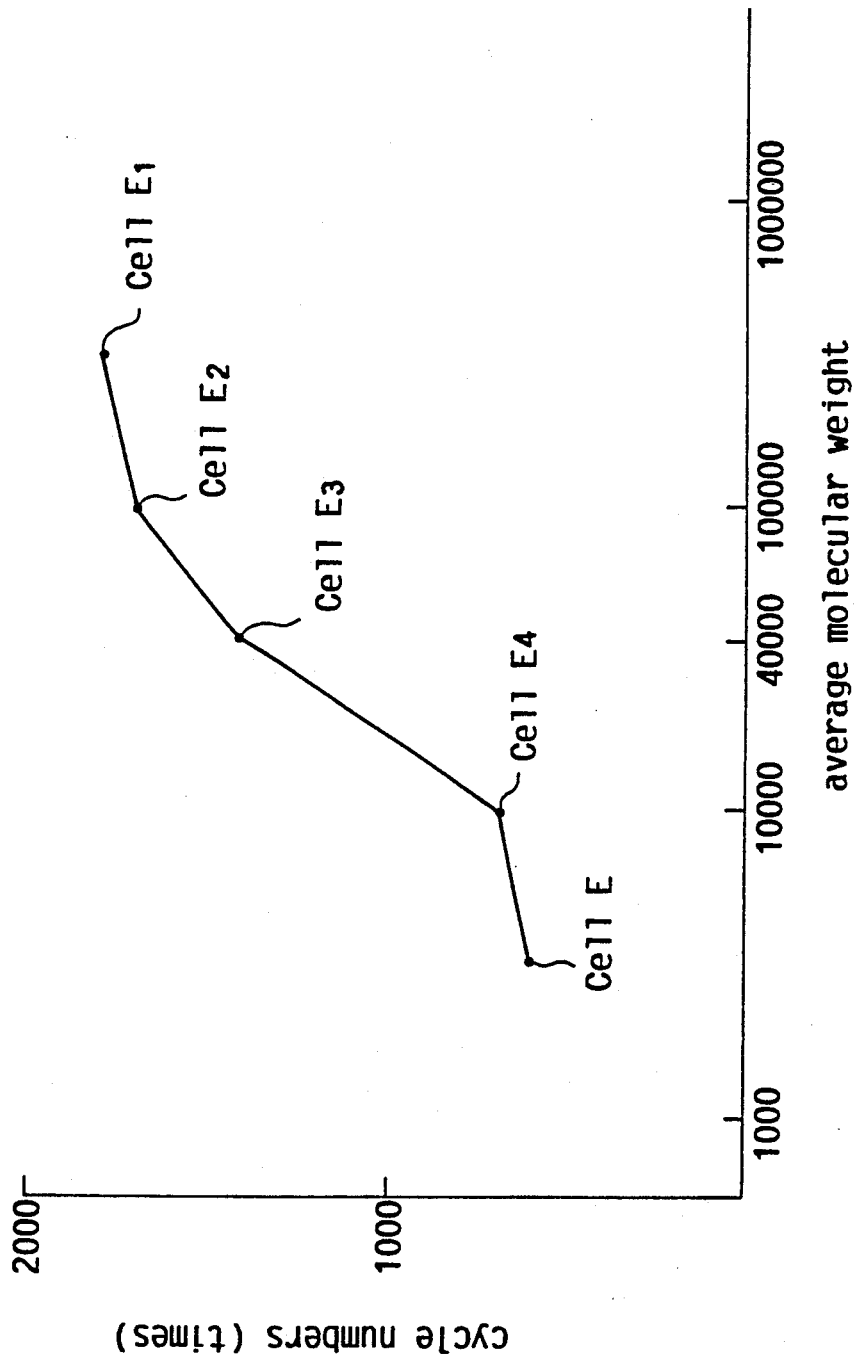
FIG. 14 is a graph showing the relationship between the average molecular weight of PVP and the cycle numbers.

The cycle characteristic of each of Cells $E_1$-$E_5$ of this invention was measured, and the results are shown in FIG. 14. The charge/discharge cycle was as follows: first, a charging operation was carried out at 1C of current under $-\Delta V$ detection (charge ending time is controlled by the amount of voltage dropped after the peak voltage), then after 1 hour pause, a discharging operation was carried out at 1C of current until the voltage came down to 0.8 V, and another 1 hour pause was taken.

As apparent from FIG. 14, each of Cells $E_1$-$E_3$ had a long cycle life, while Cells $E_4$ and $E_5$ had a just 1000 cycle life or shorter.

This seems to result from that in Cells $E_4$ and $E_5$ using PVP whose average molecular weight is small, the molecules get less bounded to each other, which helps to damage the conductive layer and to cause migration. To the contrary, in Cells $E_1$-$E_3$ using PVP whose average molecular weight is large, such problem can be avoided.

Experiment 2

Figure 15:
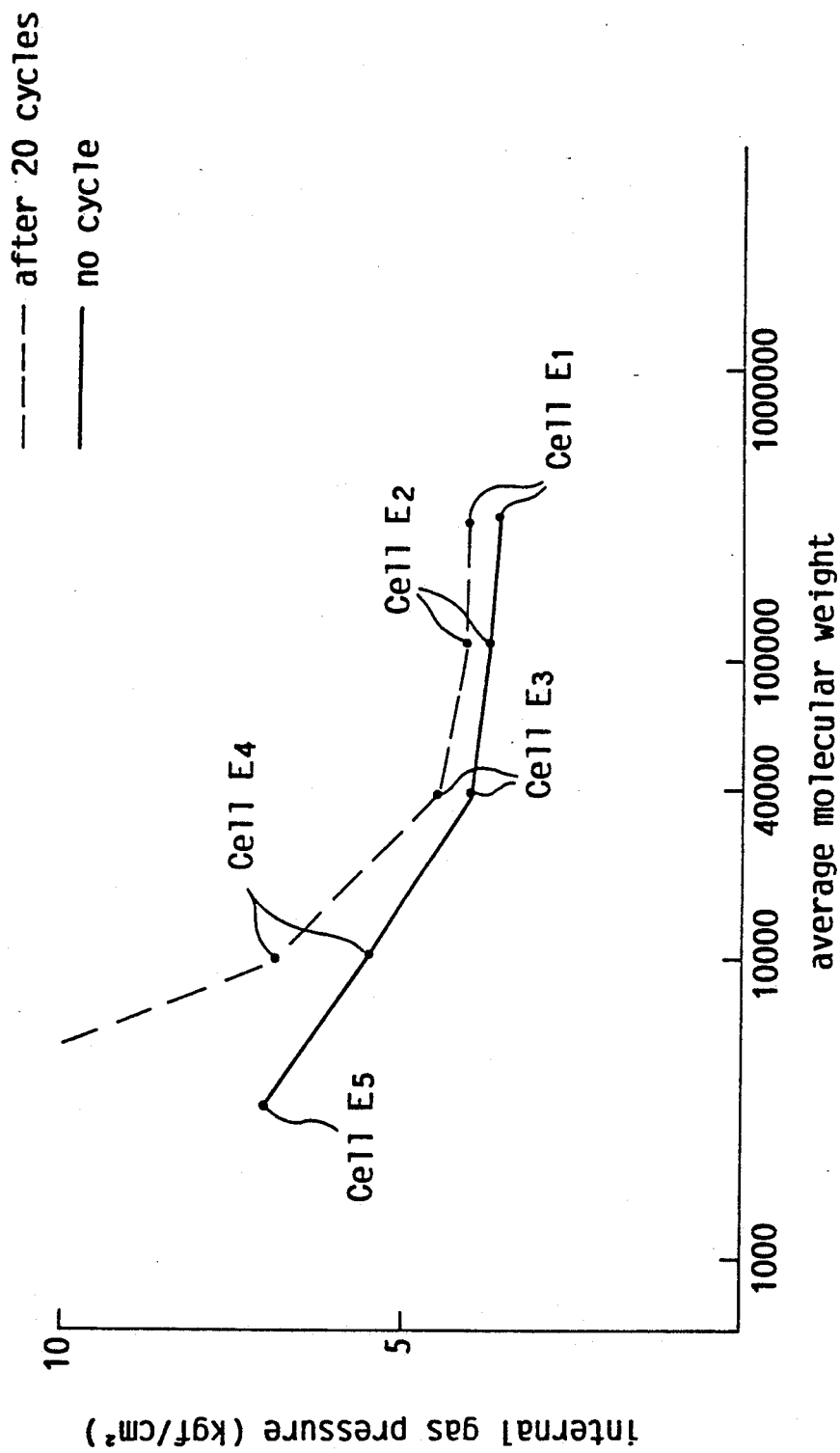
FIG. 15 is a graph showing the relationship between the average molecular weight of PVP and the gas pressure inside a cell.

Before beginning the cycle and after 20 cycles under the conditions shown in Experiment 1 above, each cell of Cells $E_1$–$E_5$ was overcharged and the gas pressure inside each cell was measured. The results are shown in FIG. 15. The charging operation was carried out at 1.5C of current up to 200% of the cell capacity.

As apparent from FIG. 15, in the case that the overcharging operation was carried out before beginning the cycle, even Cells $E_4$ and $E_5$ using PVP with light average molecular weight can restrain the raise of the internal pressure to some extent; however, after 20 cycles, the pressure raises tremendously. On the other hand, Cells $E_1$–$E_3$ using PVP with heavy average molecular weight have low pressure both before beginning the cycle and after 20 cycles.

This seems to result from that in Cells $E_4$ and $E_5$ using PVP with light average molecular weight, the conductive layer of the electrode gets damaged with the progress of the charge/discharge cycle whereby the conductivity of the negative electrode deteriorates. On the other hand, in Cells $E_1$–$E_3$ using PVP with heavy average molecular weight, such damage is restrained, whereby the conductivity is fairly maintained.

Conclusion of Experiments 1 and 2

As described hereinabove, Cells $E_4$ and $E_5$ using PVP whose average molecular weight is below 40,000, both the cycle characteristic and the oxygen gas absorption performance are deteriorated as a result of the conductive layer being damaged. On the other hand, Cells $E_1$–$E_3$ using PVP whose average molecular weight is 40,000 or more, such damage is restrained, whereby these deteriorations can be avoided. Hence, PVP having average molecule weight of 40,000 or more is desirable as a binder for the conductive layer.

Experiment 3

The same cells as Cell $E_1$ having 360,000 of PVP average molecule weight and 0.6 mg per 1 $cm^2$ of application amount of PVP and acetylene black were produced in the same manner except that the ratio of PVP and acetylene black was different. The cycle property of each cell was measured by carrying out charge/discharge operation under the same conditions as in Experiment 1. The results are shown in FIG. 16.

Figure 16:
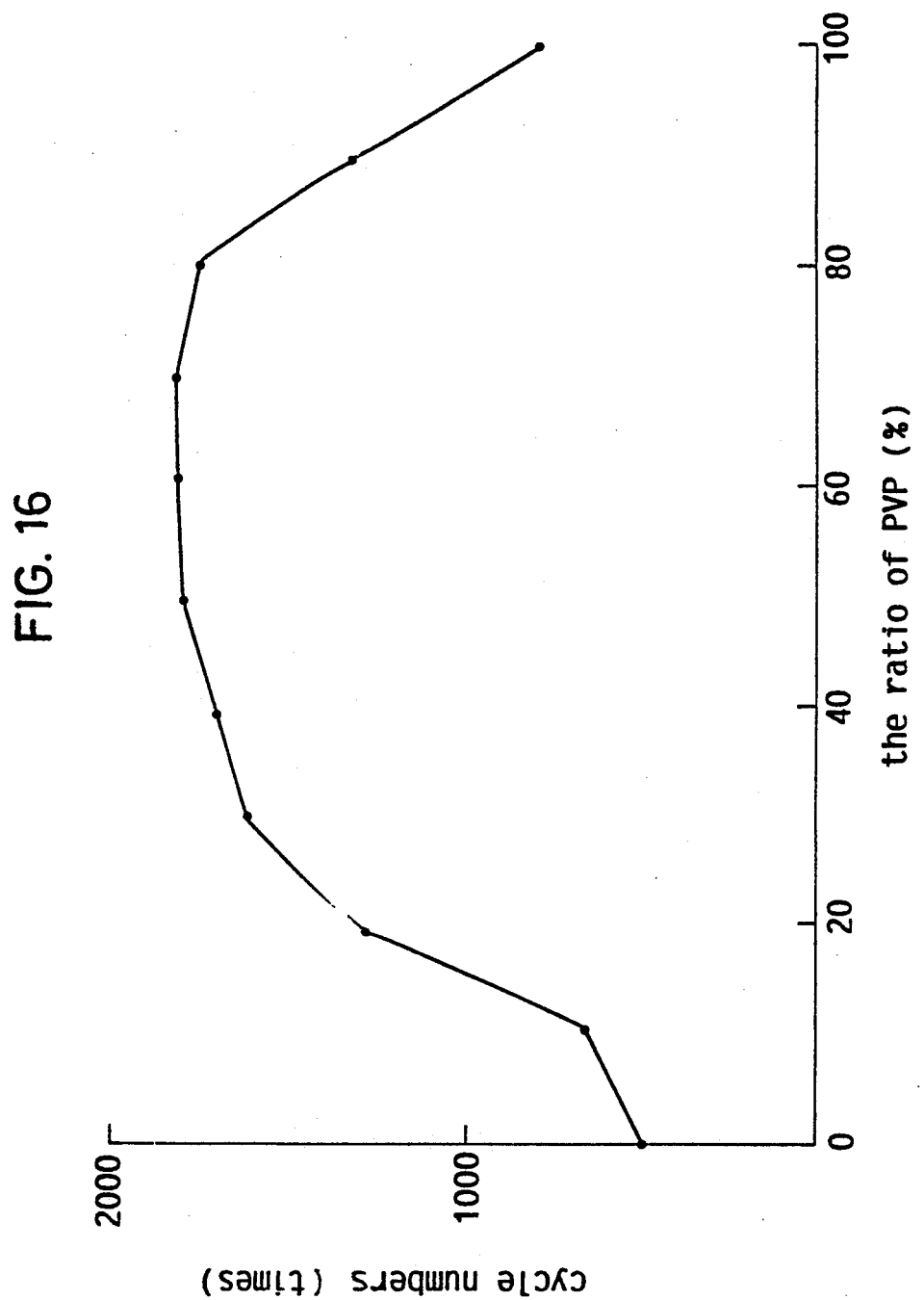
FIG. 16 is a graph showing the relationship between the ratio of PVP and the cycle numbers.

As apparent from FIG. 16, if the ratio of PVP as a binder is too small, the intensity of the conductive layer decreases and easily damaged, losing the effects to avoid migration. On the other hand, the ratio of PVP is large enough, the intensity is maintained and not easily damaged. However, the ratio is too large, the intensity is decreased and the effects to avoid migration lessen. The reason for this is not sure, but seems to result from that when a certain amount of a solid having a certain volume, namely bulky acetylene black (conductive powder), is added, PVP forms a layer by binding each solid together, whereby the intensity of the conductive layer develops. To the contrary, when the amount of the solid is very little, a layer containing PVP directly adheres to the surface of the active material, which changes the volume of the active material, whereby the conductive layer is damaged.

Experiment 4

After the same cells as in Experiment 3 were produced and overcharged before beginning the cycle, the internal pressure of each cell was measured under the same conditions as in Experiment 2. The results are shown in FIG. 17.

Figure 17:
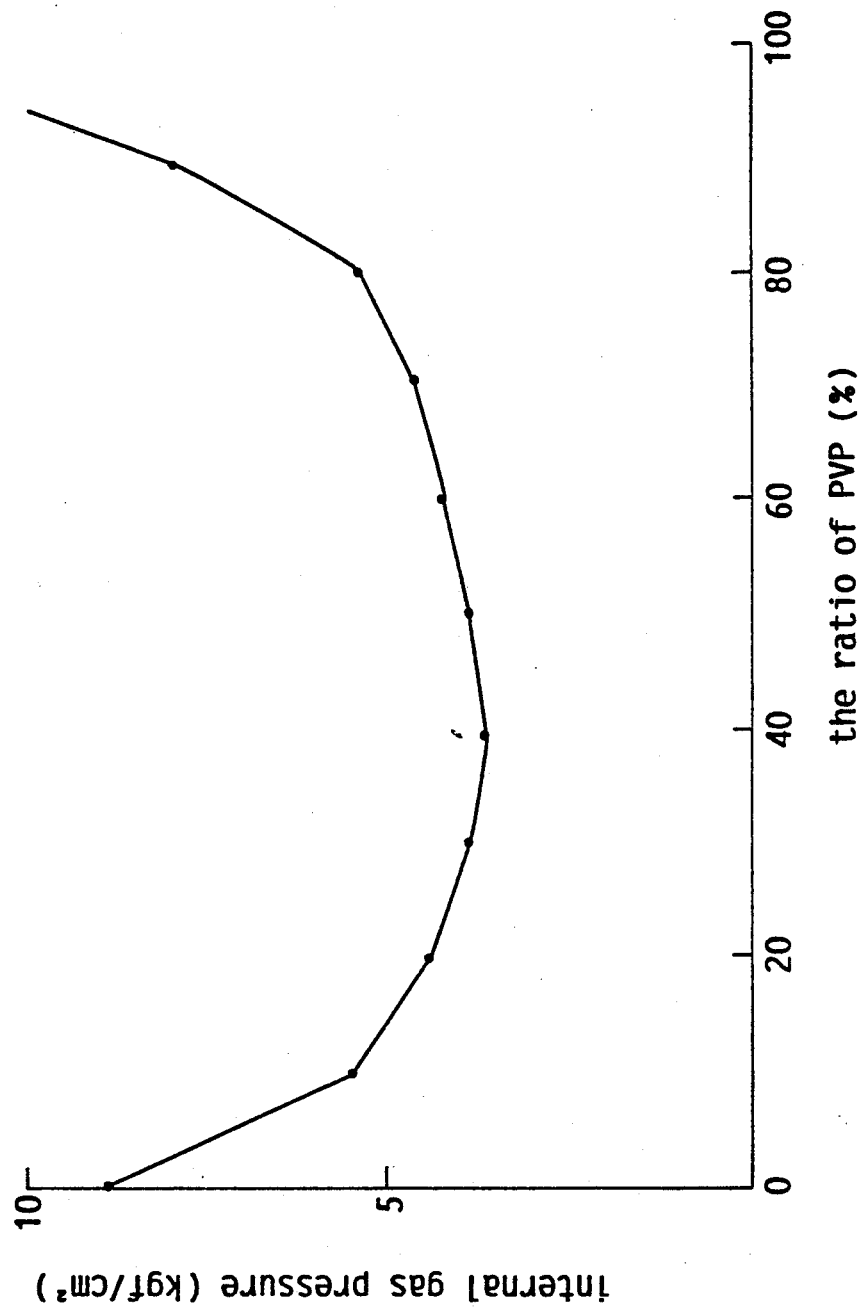
FIG. 17 is a graph showing the relationship between the ratio of PVP and the gas pressure inside a cell.

As apparent from FIG. 17, the internal pressure raises whether the ratio of PVP is too large or too small. This seems to result from that in the former case, the superfluous PVP disperses acetylene black (conductive powder), whereby the conductivity of the conductive layer deteriorates, and in the latter case, the tie between each conductive powder lessens, whereby the conductive layer is damaged.

Conclusion of Experiments 3 and 4

As described hereinabove, either too large or too small ratio of PVP causes the deterioration of the cycle characteristic or the development of cell internal pressure. Hence, as FIGS. 16 and 17 show, the preferable ratio of PVP and conductive powder is between 2:8 and 8:2.

Experiment 5

After the same cells as Cell $E_1$ having PVP and acetylene black in a ratio of 1:1 and 360,000 of PVP average molecule weight were produced in the same manner except that the application amount of PVP and acetylene black is changed within a range of 0.01–10 mg per 1 $cm^2$, the cycle characteristic of each cell was measured by carrying a charge/discharge operation under the same conditions as in Experiment 1. The results are shown in FIG. 18.

Figure 18:
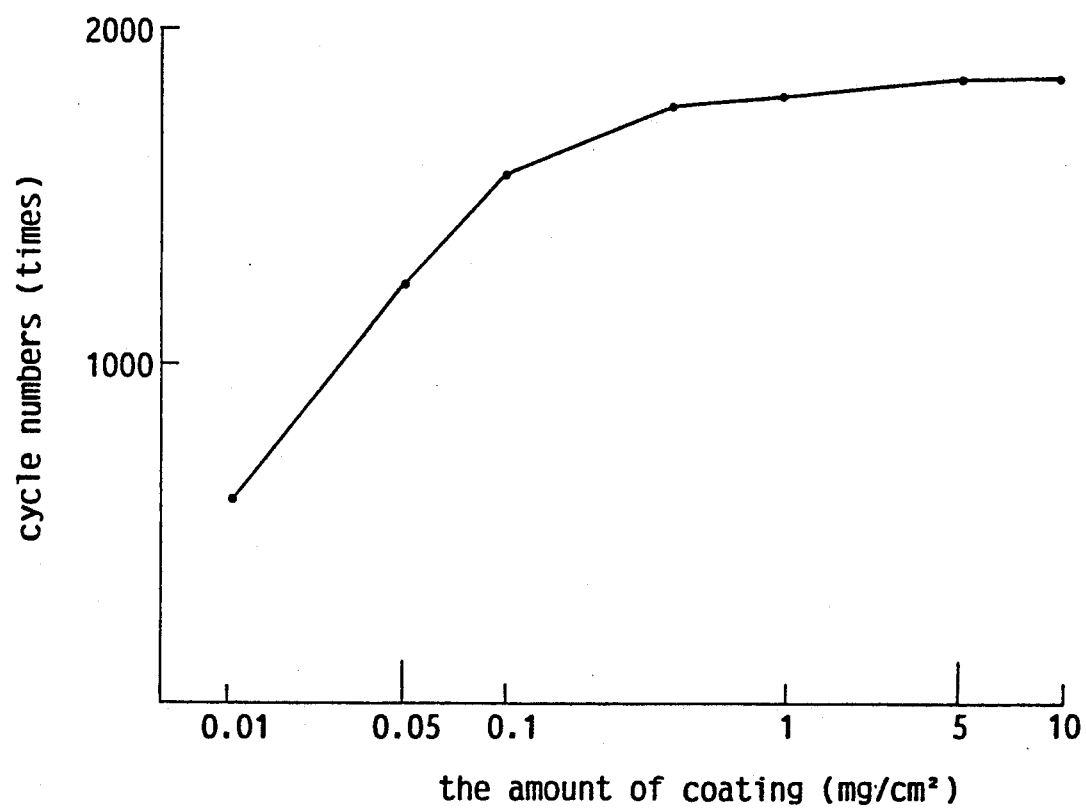
FIG. 18 is a graph showing the relationship between the amount of PVP and acetylene black to be applied and the cycle numbers.

As apparent from FIG. 18, when the application amount of PVP and acetylene black is 0.05 mg or more per 1 $cm^2$, excellent cycle characteristic can be obtained.

This seems to result from that when the application amount is below 0.05 mg per 1 $cm^2$, the conductive layer is damaged by the status change of the active material caused during a charging/discharging operation. However, with more of the application amount, the conductive layer is not damaged, and as a consequence, cadmium migration can be effectively restrained.

Experiment 6

The same cells as in Experiment 5 were produced, and the operational voltage of each cell was measured in the 1st cycle at the point that half of the capacity had been discharged. The charge/discharge cycle was in the same conditions as in Experiment 1. The results are shown in FIG. 19.

Figure 19:
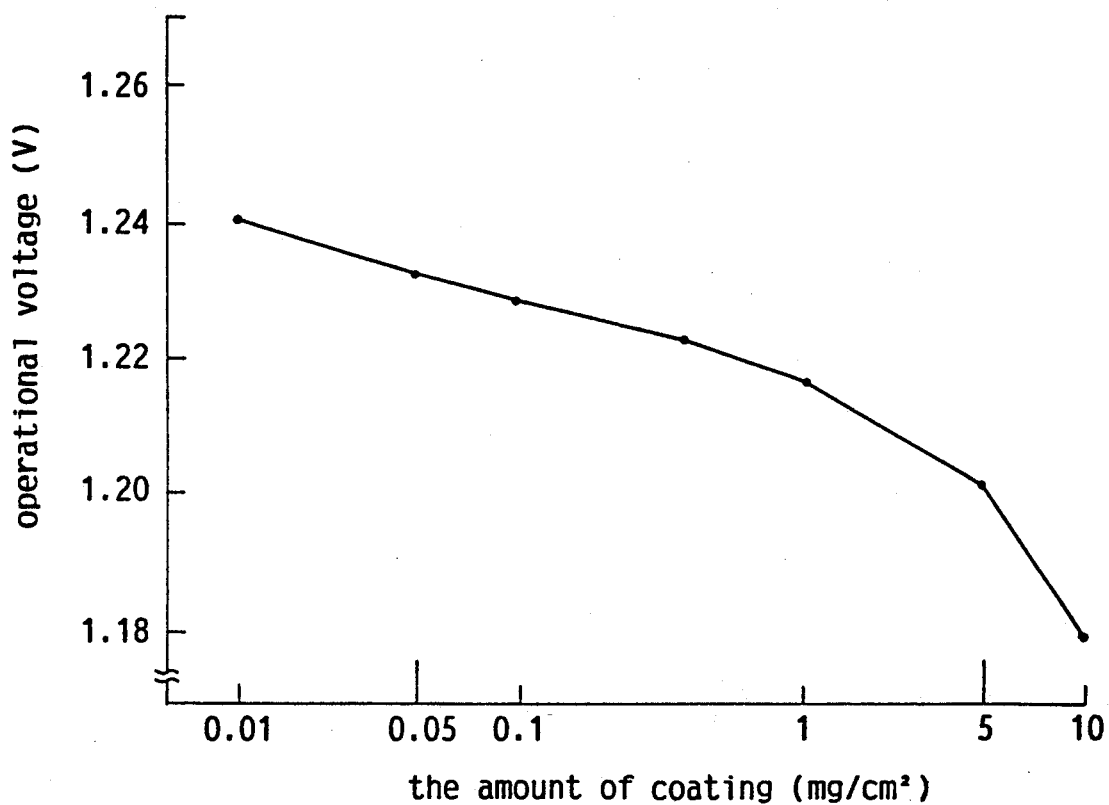
FIG. 19 is a graph showing the relationship between the amount of PVP and acetylene black to be applied and the operating voltage of a cell.

As apparent from FIG. 19, when the application amount of PVP and acetylene black is 5 mg or lower per 1 $cm^2$, the cell voltage is 1.2 V or higher, while the amount is over 5 mg per 1 $cm^2$, the cell voltage is 1.2 V or lower.

This seems to result from that the application amount over 5 mg per 1 $cm^2$ hinders the dispersion of the electrolyte, while the amount lower than 5 mg dose not.

Conclusion of Experiments 5 and 6

Experiment 5 proves that effective restraint of cadmium migration requires the application amount of PVP and acetylene black to be 5 mg or higher per 1 $cm^2$, while the development of cell voltage requires the amount to be 5 mg or lower per 1 $cm^2$. Hence, the preferable application amount of them is between 0.05 mg and 5 mg per 1 $cm^2$,

Embodiment 6
Example 1

The cell of this example was produced in the same manner as Example 1 of Embodiment 1 except that 5% PVA aqueous solution (20 wt %) was used in place of the aqueous solution of 5% hydroxypropylcellulose (HPC) as a binder in forming the active material paste.

The cell thus produced is hereinafter referred to as Cell F.

Example 2

Cell A of Example 1 of Embodiment 1 was used as the cell of this example.

Comparative Example

The cells of this example were produced in the same manner as in Example 1 except that no conductive layer was formed.

The cell thus produced is hereinafter referred to as Cell T.

Table 7 below shows differences in the ingredients of these cells.

TABLE 7

| CELLS | NEGATIVE ELECTRODE | |
|---|---|---|
| | binders for active material paste | binders for the conductive layer forming solution |
| F | PVA | PVP |
| A | HPC | PVP |
| T | PVA | no conductive layer |

Experiment 1

Figure 20:
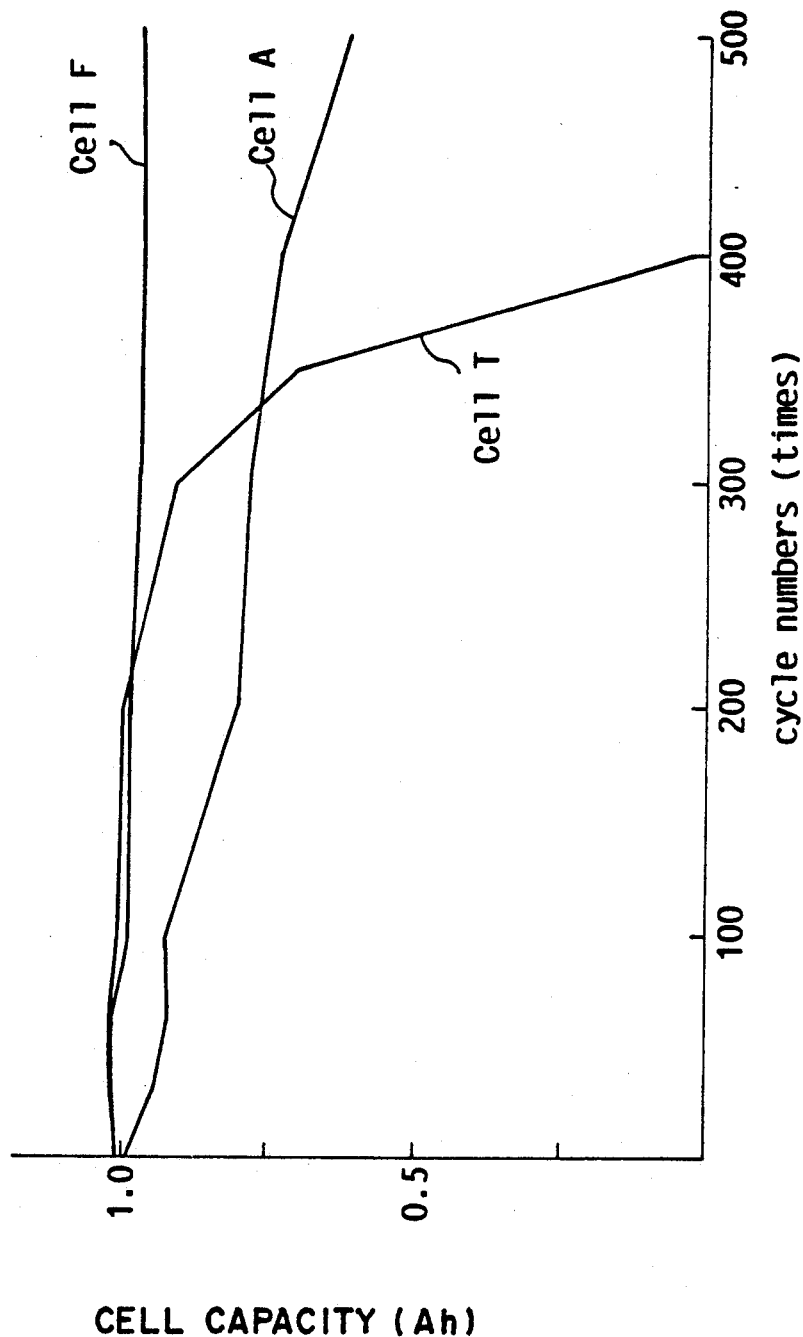
FIG. 20 is a graph showing the cycle characteristic of each of Cells A and F of this invention and Cell T of the comparative example.

The cycle characteristic of each of Cells A and F of this invention and Cell T of the comparative example were measured, and the results are shown in FIG. 20. The charge/discharge cycle was as follows: first, a charging operation was carried out for 16 hours at 0.1C of current, then after 1 hour pause, a discharging operation was carried out at 4C of current until the voltage came down to 0.8 V.

As apparent from FIG. 20, in Cell T, the cell capacity dropped rapidly around the 300th cycle, unlike in Cells A and F of this invention. Cell F maintained the initial capacity even after the 500th cycle.

After 300 cycles passed, the amount of cadmium transferred into the separator of each cell was measured. The results are shown in Table 8 below.

TABLE 8

| CELLS | THE AMOUNT OF CADMIUM (mg/cell) |
|---|---|
| F | 9 |
| A | 12 |
| T | 95 |

As apparent from Table 8, in Cell T of the comparative example, the amount of cadmium greatly increased, unlike Cells A and F of this invention. This seems to result from that in Cell T, migration of the active material caused short circuit between the positive and negative electrodes, whereby the cell capacity was suddenly diminished.

The cycle characteristic of Cell F seemed to be more retrained than that of Cell A due to the following reasons:

In Cell A, HPC used as a binder did not effectively work to avoid the agglomeration or passivation of the active material. As a result, the function of the negative electrode was deteriorated and the cell capacity was diminished. On the other hand, in Cell F using PVP, such problem did not happen.

Experiment 2

Figure 21:
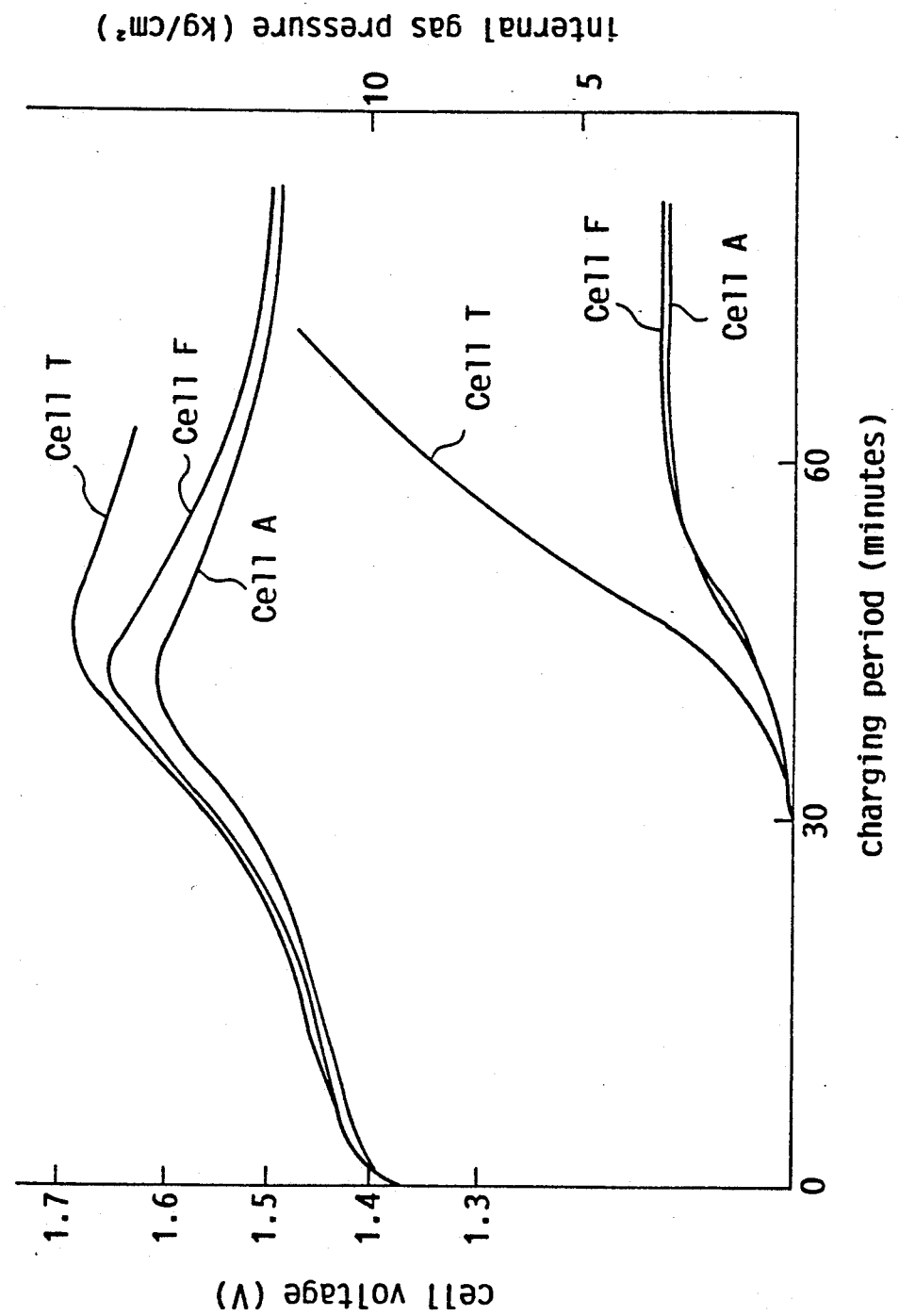
FIG. 21 is a graph showing the relationship between the charging hour, the gas pressure, and the voltage inside each of the same cell as in FIG. 20.

The change in the cell voltage and gas pressure inside each of Cells A and F of this invention and Cell T of the comparative example were measured. The results are shown in FIG. 21. The charging operation was carried out at 1.5 C of current.

As apparent from FIG. 21, the gas pressure inside Cell T having no layer on the surface of the negative electrode was suddenly developed with the time passing, while those of Cells A and F remained low.

Experiment 3

After each of Cells A and F of this invention and Cell T of the comparative example was preserved for 60 days at 40° C., the reducing rate of each cell capacity was measured. Then, each cell was broken down and the specific surface of the negative electrode and the ratio of $\gamma$ type cadmium hydroxide to $\beta$ type cadmium hydroxide was measured. The results are shown in Table 9 below. The cell capacity reducing rate was found by the following formula. The crystal form ($\beta$ or $\gamma$) of cadmium hydroxide was determined with the use of X-ray diffraction method.

[mathematics 1]

cell capacity reducing rate =

$$\frac{\text{cell capacity after 60 day preservation}}{\text{initial cell capacity}} \times 100$$

TABLE 9

| CELLS | CAPACITY REDUCING RATE (%) | SPECIFIC SURFACE (m/g) | $\gamma/\beta$ |
|---|---|---|---|
| F | 101 | 2.54 | 0.77 |
| A | 89 | 1.31 | 0 |
| T | 99 | 2.38 | 0.62 |

As apparent from Table 9, Cell F of this invention and Cell T of the comparative example each having a negative electrode whose active material using PVA as a binder had a smaller capacity reducing rate and more excellent preserving property than Cell A of this invention using HPC instead.

Also, PVA existing in the vicinity of the active material can effectively restrain the phase transfer of cadmium hydroxide from $\gamma$ to $\beta$.

Embodiment 7
Example 1

The cell of this example was produced in the same manner as Example 1 of Embodiment 1 except that 20 wt % of 2.5% PVA aqueous solution (containing 0.5 wt % of PVA) and 0.5 wt % of HPC, a kind of cellulosic water soluble polymer, were used in place of the aqueous solution of 5% hydroxypropylcellulose (HPC) as a binder in forming the active material paste.

The cell thus produced is hereinafter referred to as Cell G.

Example 2

Cell F of Example 1 of Embodiment 6 was used as the cell of this example.

Comparative Example 1

The cell of this example was produced in the same manner as in Example 1 above except that no conductive layer was formed.

The cell thus produced is hereinafter referred to as Cell U.

Comparative Example 2

Cell T of Comparative example of Embodiment 6 was used as the cell of this example.

Table 10 below shows differences in the ingredients of these cells.

TABLE 10

| | NEGATIVE ELECTRODE | |
|---|---|---|
| CELLS | binders for active material paste | binders for the conductive layer forming solution |
| G | PVA + HPC | PVP |
| F | PVA | PVP |
| U | PVA + HPC | no conductive layer |
| T | PVA | no conductive layer |

Experiment

The gas pressure inside each of Cells F and G of this invention as well as Cells U and T of the comparative examples were measured after charged at a high rate. The results are shown in Table 11. The charging operation was carried out for 25 minutes at 3C of current.

TABLE 11

| CELLS | INTERNAL GAS PRESSURE (kg/cm$^2$) |
|---|---|
| G | 5.8 |
| F | 10.6 |
| U | 16.2 |
| T | 19.7 |

As apparent from Table 11, the development of the internal gas pressure of Cell F and G of this invention is more restricted than those of Cells U and T of the comparative examples. Especially in Cell G, the pressure is tremendously low.

Such difference in the internal gas pressure seems to result from the following:

In Cell U having no conductive layer, the oxygen gas absorption performance deteriorates, while in Cell T exclusively using PVA as the binder for the active material, the active material is covered with PVA so that its conductivity is lowered, whereby the oxygen gas absorption property is tremendously decreased together with the same reason as in Cell U.

On the other hand, in Cell G of this invention having a conductive layer with large intensity and HPC added as a binder for the active material, PVA loses its film forming property, still retaining its capability as a binder. As a result, the oxygen gas absorption performance is maintained. However, in Cell F of this invention exclusively using PVA as the binder, the active material is covered with PVA, so that its conductivity is slightly lowered, whereby its oxygen gas absorption performance is lowered unlike in Cell G.

If the conductive layer is formed on the surface of the active material layer, the effects of adding HPC to the binder is emphasized. This is apparent from Table 11, where the difference in internal gas pressure between Cells F and G is much larger than between Cells U and T. Such difference seems to result from that the function of HPC to spoil the film property of PVA is applied also to the surface of the electrode, and as a consequence, more and more active metal cadmium which is generated by a charging operation is exposed on the surface of the electrode.

Embodiment 8

Example 1

The cell of this example was produced in the same manner as Example 1 of Embodiment 1 except that 1 wt % of fluororesin (Du Pont-Mitsui Chlorochemicals Co., Ltd. Teflon fine powder) and 20 wt % of demineralized water were used in place of the nylon fiber and 5% HPC in forming the active material paste.

The cell thus produced is hereinafter referred to as Cell H.

Example 2

Cell A of Example 1 of Embodiment 1 was used as the cell of this example.

Comparative Example 1

The cell of this example was produced in the same manner as in Example 1 of this embodiment except that no conductive layer was formed.

The cell thus produced is hereinafter referred to as Cell V.

Comparative Example 2

Cell $Q_3$ of Comparative example 3 of Embodiment 1 was used as the cell of this example.

Table 12 below shows differences in the ingredients of these cells.

TABLE 12

| | NEGATIVE ELECTRODE | |
|---|---|---|
| CELLS | binders for active material paste | binders for the conductive layer forming solution |
| H | fluororesin | PVP |
| A | HPC | PVP |
| V | fluororesin | no conductive layer |
| $Q_3$ | HPC | no conductive layer |

Experiment 1

Figure 22:
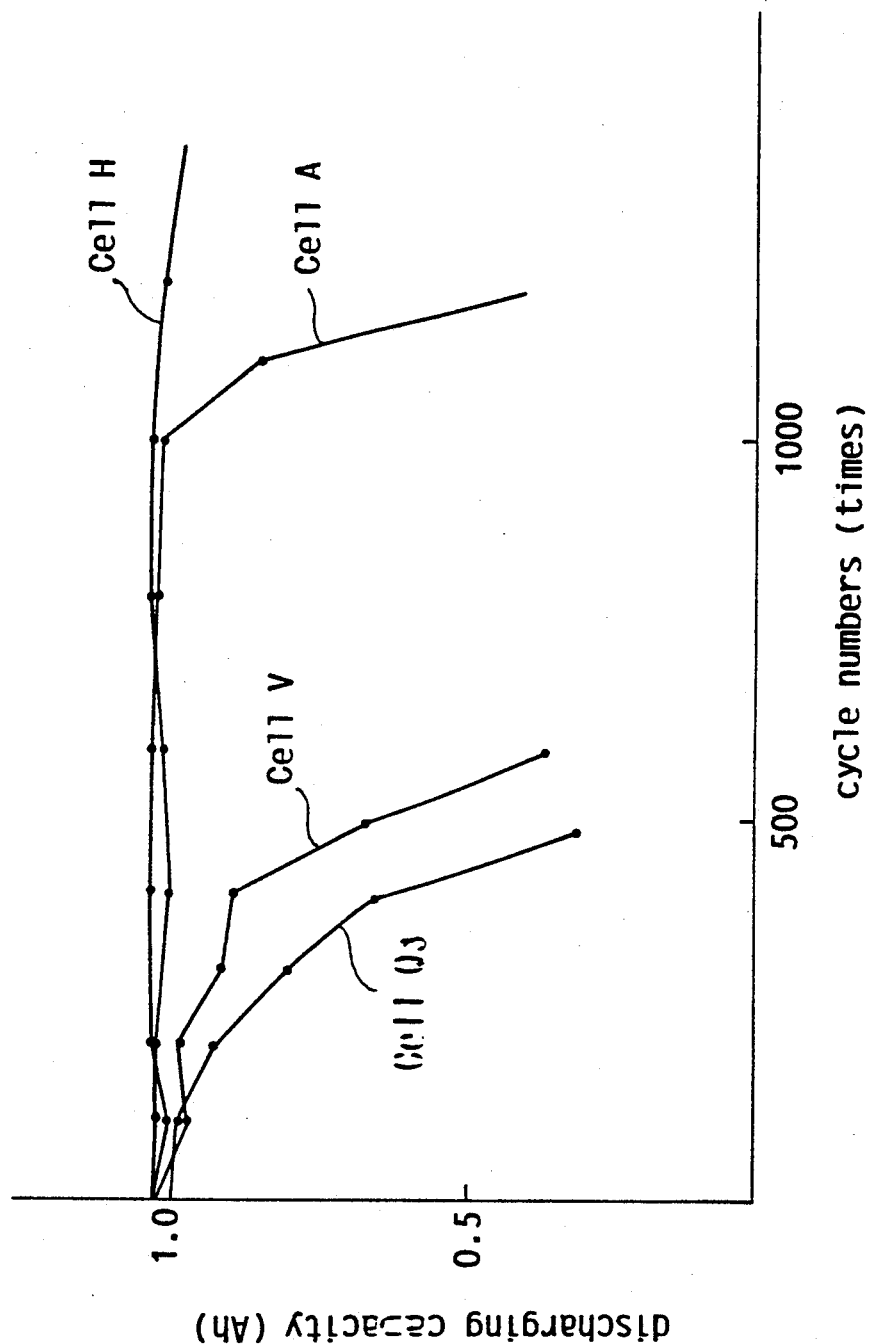
FIG. 22 is a graph showing the cycle characteristic of each of Cells A and H of this invention and Cells $Q_3$ and V of the comparative examples.

The cycle characteristic of each of Cell A and H of this invention as well as Cells V and $Q_3$ of the comparative examples were measured, and the results are shown in FIG. 22. The charge/discharge cycle was as follows: first, a charging operation was carried out at 1C of current under minus delta V detection, then after 1 hour pause, a discharging operation was carried out at 1C of current until the voltage came down to 0.8 V.

As apparent from FIG. 22, in Cells V and $Q_3$ of the comparative examples, the cell capacity was suddenly diminished after the 400th and the 300th cycle respectively. On the other hand, in Cell A of this invention, the cell capacity was not reduced so much until about the 1100th cycle. In Cell H of this invention, the cell capacity remains the same even after further repetition of the cycle.

Experiment 2

After 300 cycles were passed in the same manner as in Experiment 1 of this embodiment, the amount of cadmium transferred into the separator of each cell was measured. The results are shown in Table 13 below.

The cadmium thus transferred was measured by atomic absorption spectro photometry after breaking down each cell, taking the separator out of it, abstracting cadmium from the separator with the use of hydrochloric acid.

TABLE 13

| CELLS | THE AMOUNT OF CADMIUM (mg/cell) |
|---|---|
| H | 5 |
| A | 12 |
| V | 55 |
| $Q_3$ | 76 |

As apparent from Table 13, the amount of cadmium greatly increased in Cells V and $Q_3$ of the comparative examples, did not increase very much in Cell A of this invention, and greatly decreased in Cell H of this invention. These results seem to prove that in Cells V and $Q_3$, shorting was caused during the repetition of charge/discharge operation, whereby the cycle property was deteriorated as shown in Experiment 1. On the other hand, in Cells A and H, such shorting could be restrained.

Embodiment 9

Example 1

The cell of this example was produced in the same manner as Example 1 of Embodiment 6 except that a separator was produced as follows:

First, well-known polypropylene fiber having a diameter of 1.0–1.5 denier and ES fiber (Chisso Corporation), as adhesion fiber, which is polyethylene-polypropylene compound fiber having about 1.0 denier were evenly mixed at the ratio of 1:1 in weight, and the mixture thus produced was melt by heating, whereby nonwoven cloth having 80 g/m$_2$ of weight and 0.20 mm of thickness was produced. This cloth was then put into a reaction vessel made of iron. The vessel was vacuumized and then supplied with reaction gas (fluorine gas was diluted with nitrogen gas) up to the atmospheric pressure to make a reaction for a certain period of time.

The cell thus produced is hereinafter referred to as Cell $I_1$.

Example 2

The cell of this example was produced in the same manner as Example 1 of this embodiment except that the polypropylene nonwoven cloth was not treated with fluorine gas but processed as follows:

First, the polypropylene nonwoven cloth was soaked in 20% of fuming sulfuric acid for 15 minutes at 35° C. Then, it was sulfonated, then soaked in sulfuric acid of 90%, 60%, and 30% density in sequence, washed with water, and dried.

The cell thus produced is hereinafter referred to as Cell $I_2$.

Example 3

The cell of this example was produced in the same manner as Example 1 of this embodiment except that 20 wt % of 5% hydroxypropylcellulose (HPC) was used for the active material paste in place of 20 wt % of 5% PVA in forming the negative electrode.

The cell thus produced is hereinafter referred to as Cell $I_3$.

Example 4

The cell of this example was produced in the same manner as in Example 3 of this embodiment except that no fluorine gas treatment was applied to the separator.

The cell thus produced is hereinafter referred to as Cell $I_4$.

Example 5

The cell of this example was produced in the same manner as in Example 1 of this embodiment except that no fluorine gas treatment was applied to the separator.

The cell thus produced is hereinafter referred to as Cell

Comparative Example 1

The cell of this example was produced in the same manner as Example 1 of this embodiment except that 10 wt % of PVA was used in place of 10 wt % of PVP in the film forming solution.

The cell thus produced is hereinafter referred to as Cell $W_1$.

Comparative Example 2

The cell of this example was produced in the same manner as Example 1 of this embodiment except that 10 wt % of PVA was used in place of 10 wt % of PVP in the film forming solution, and that no fluorine gas treatment was applied to the separator.

The cell thus produced is hereinafter referred to as Cell $W_2$.

Comparative Example 3

The cell of this example was produced in the same manner as Comparative example 2 of this embodiment except that no conductive layer was formed on the active material layer.

The cell thus produced is hereinafter referred to as Cell $W_3$.

Table 14 below shows differences in the ingredients of these cells.

TABLE 14

| CELLS | NEGATIVE ELECTRODE binders for active material paste | binders for the conductive layer forming solution | SEPARATOR treatment (types) |
|---|---|---|---|
| $I_1$ | PVA | PVP | fluorine gas |
| $I_2$ | PVA | PVP | sulfonated |
| $I_3$ | HPC | PVP | fluorine gas |
| $I_4$ | HPC | PVP | no |
| $I_5$ | PVA | PVP | no |
| $W_1$ | PVA | PVA | fluorine gas |
| $W_2$ | PVA | PVA | no |
| $W_3$ | PVA | no conductive layer | no |

Experiment 1

Cells $I_1$, $I_2$, and $I_5$ of this invention and Cells $W_1$–$W_3$ of the comparative examples were charged at 1.5C of current and the gas pressure inside each cell in a charging operation was measured. The results are shown in FIG. 23.

(1) The difference due to the presence/absence of a conductive layer

Figure 23:
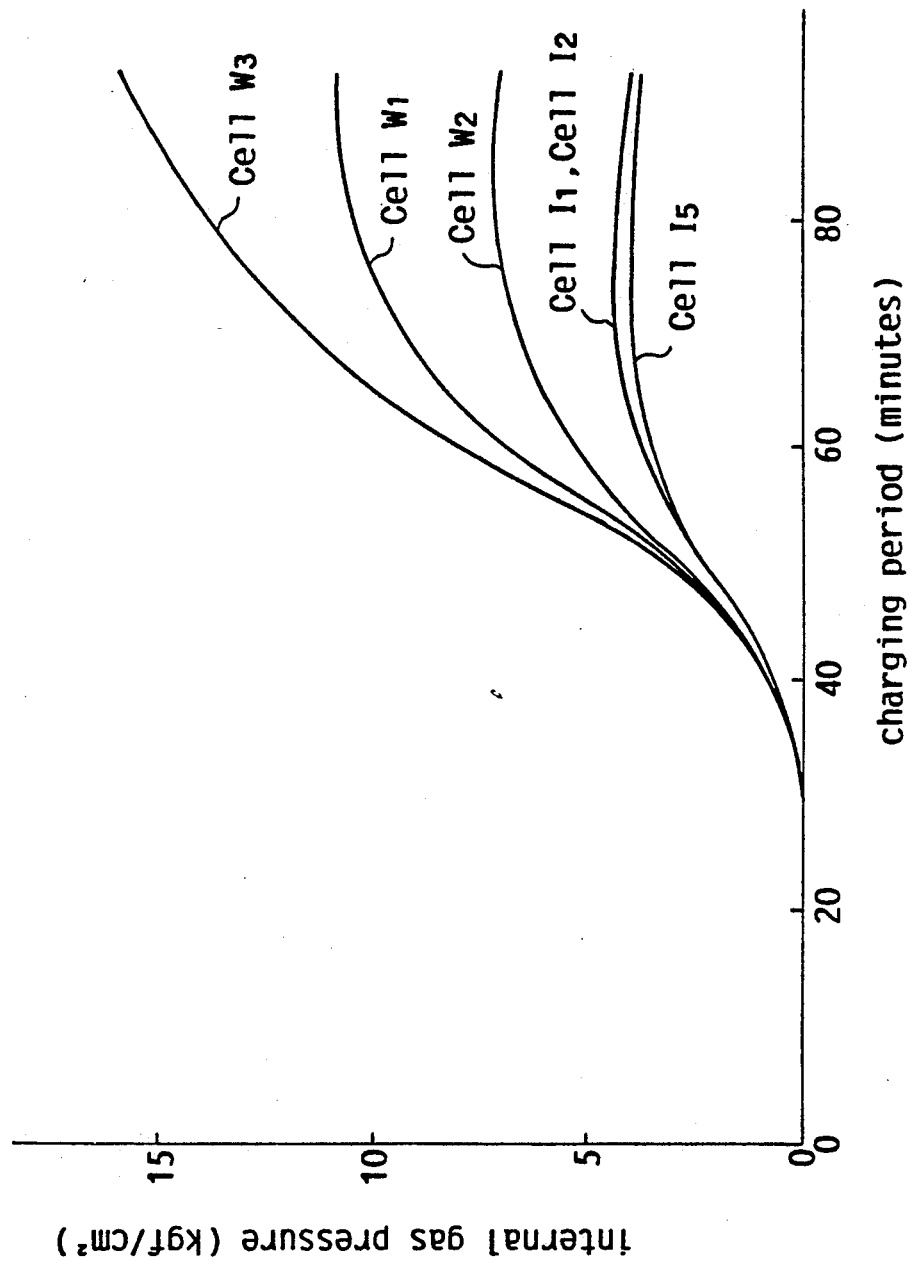
FIG. 23 is a graph showing the relationship between the charging hour and the gas pressure inside each of Cells $I_1$-$I_3$ of this invention and Cells $W_1$-$W_3$ of the comparative examples.

As apparent from FIG. 23, Cells $I_1$, $I_2$, $I_5$, $W_1$, and $W_2$ each having a conductive layer on the surface of the negative electrode have lower internal gas pressure than Cell $W_3$ having no conductive layer. Hence it was confirmed that the presence of a conductive layer had an effect on oxygen gas absorption performance.

(2) The difference due to the types of a binder for the conductive layer

1. when PVA is used as a binder

As apparent form FIG. 23, Cells $W_1$ and $W_2$ using PVA as a binder for the conductive layer have larger internal gas pressure than Cells $I_1$, $I_2$, and $I_5$ using PVP as a binder. This seems to result from that the use of PVA having swelling property makes the conductive layer, which is in contact with the separator holding the electrolyte, swell and be covered with a large amount of electrolyte. As a result, forming and holding boundaries of three phases on the surface of the electrode becomes harder, whereby its oxygen gas absorption performance is deteriorated.

In addition, it was observed that Cell W had larger gas pressure than Cell $W_2$. This seems to result from that in Cell $W_1$ using a PP separator applied with hydrophilic property, the conductive layer is swollen due to the touching separator holding a large amount of electrolyte, which covers the surface of the electrode. As a result, the same problems were brought about as above.

2. when PVP is used as a binder

As mentioned above, Cells $I_1$, $I_2$, and $I_5$ using PVP as a binder have all low internal gas pressure, and very little effects on the gas absorption performance whether its separator is hydrophilic or not. This seems to result from that even if PVP having no swelling property is combined with a PP separator applied with hydrophilic property, the conductive layer is not covered with a large amount of electrolyte, whereby boundaries of three phases are well formed and maintained. Hence, the oxygen gas absorption performance is not so lower, compared to the case that PVP is combined with a PP separator having poor electrolyte absorption.

Experiment 2

Figure 24:
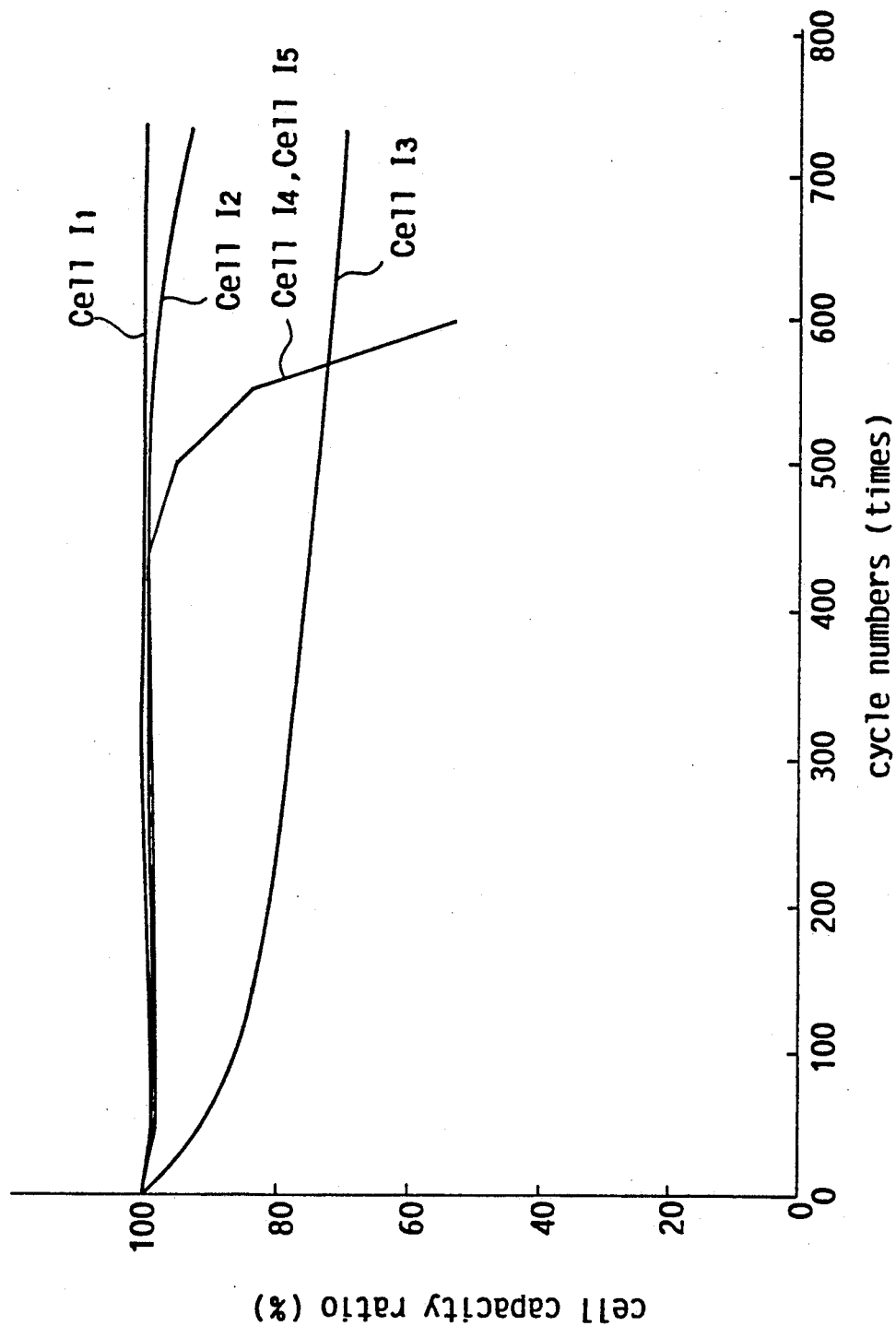
FIG. 24 is a graph showing the cycle characteristic of each of Cells $I_1$-$I_5$ of this invention.

The cycle property of each of Cells $I_1$–$I_5$ of this invention were measured, and the results are shown in FIG. 24. The charge/discharge cycle was as follows: first, a charging operation was carried out for 1 hour at 1.5C of current, and a discharging operation was carried out at 1C of current at 25° C. until the voltage came down to 1.0 V.

(1) The difference due to the presence/absence of a treatment to the separator

As apparent from FIG. 24, Cells $I_1$–$I_3$ of this invention using a PP separator which was hydrophilic processed has longer cycle life than Cells $I_4$ and $I_5$ of this invention using a PP separator without such process. Hence, it proved that such hydrophilic process had an effect on the dryout of the separator.

(2) The difference due to the types of a binder for the active material paste

Of the cells having hydrophilic processed separators, Cells $I_1$ and $I_2$ present stable cycle property without losing their initial capacity unlike Cell $I_3$. This seems to result from the following reason:

In Cell $I_3$, the active material is agglomerated by the surface-active agent on the surface of the separator fiber as a result of the surface-active agent being dissolved during fluorine gas treatment, whereby the discharging property of the cadmium negative electrode was deteriorated. On the other hand, in Cells $I_1$ and $I_2$ using PVA in the active material, the agglomeration of the active material can be prevented even with the dissolution of the surface-active agent, whereby no deterioration of the discharging property of the cadmium negative electrode happens.

(3) The difference due to the processing types of a separator

The cell capacity of Cell $I_1$ of this invention remains the same even after the 600th cycle, while that of Cell $I_2$ of this invention slightly reduced after the 600th cycle. This seems to result from the difference in the degree of hydrophilic property due to the different hydrophilic processes of the separator.

If the sulfonation treatment applied to Cell $I_2$ of this invention is carried out under strict process conditions to strengthen hydrophilic degree, it makes not only the surface but also the internal part of fiber react because of a nature of liquid, whereby the mechanical tension of the separator is weakened. Hence, appropriate processing conditions should be provided not to raise the hydrophilic degree infinitely. As a result, the cell capacity seems to be decreased after the 600th cycle.

On the other hand, in Cell $I_1$ of this invention employing fluorine gas treatment, the reaction does not reach the internal part of the fabric even under enough hydrophilic conditions because of a nature of gas, so that mechanical intensity of the separator does not reduced. Accordingly, the separator can be applied with enough hydrophilic property, getting excellent cycle property.

Others (1) Although cadmium oxide and metal cadmium were used as cadmium active material in each of the embodiments above, either of them can be used solely. Furthermore, cadmium hydroxide or other cadmium compounds can be used solely or in combination, or another material can be added thereto.

(2) Although carbon powder was used as conductive powder in these embodiments, silver powder, copper powder, or the like can be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rechargeable alkaline storage cell comprising:
    a negative electrode including an active material layer and a conductive layer formed on the active layer, the active layer including cadmium active material, the conductive layer including polyvinylpyrrolidone as a binder and conductive powder;
    a positive electrode; and
    a separator disposed between the electrodes.

2. The cell of claim 1, wherein the conductive layer further includes fluororesin powder.

3. The cell of claim 1 further comprises a fluororesin layer being formed on the conductive layer.

4. The cell of claim 1, wherein the conductive layer further includes polyvinyl alcohol as another binder.

5. The cell of claim 4, wherein the ratio of polyvinyl alcohol to all the binders included in the conductive layer is between 0.05 and 0.5.

6. The cell of claim 1, wherein the average molecular weight of polyvinylpyrrolidone is 40,000 or more.

7. The cell of claim 1, wherein polyvinylpyrrolidone and the conductive powder are in the ratio between 2:8 and 8:2 in weight.

8. The cell of claim 1, wherein the conductive layer is formed at the ratio of 0.05 to 5 mg per 1 $cm^2$ on the surface of the active material layer.

9. The cell of claim 1, wherein polyvinyl alcohol is used as a binder contained in the active material layer.

10. The cell of claim 1, wherein polyvinyl alcohol and a cellulosic water soluble polymer in the form of fine particles dispersed in the matrix of polyvinyl alcohol are used as a binder contained in the active material layer.

11. The cell of claim 1, wherein the active material layer comprises fluororesin.

12. The cell of claim 9, wherein a fiber of the separator is polyolefin resin, the fiber having been applied with hydrophilic treatment.

13. The cell of claim 12, wherein the treatment is to give polyolefin resin a contact reaction with reaction gas containing fluorine gas.

14. A rechargeable alkaline storage cell comprising:
 a negative electrode including an active material layer and a conductive layer formed on the active layer, the active layer including active material paste comprises of a cadmium active material, the paste being coated on the conductive substrate, the conductive layer including polyvinylpyrrolidone as a binder and conductive powder;
 a positive electrode; and
 a separator disposed between the electrodes.

15. The cell of claim 14, wherein the conductive layer further includes fluororesin powder.

16. The cell of claim 14 further comprises a fluororesin layer being formed on the conductive layer.

17. The cell of claim 14, wherein the conductive layer further includes polyvinyl alcohol as another binder.

18. The cell of claim 14, wherein the average molecular weight of polyvinylpyrrolidone is 40,000 or more.

19. The cell of claim 14, wherein polyvinyl alcohol is used as a binder contained in the active material layer.

20. The cell of claim 14, wherein polyvinyl alcohol and a cellulosic water soluble polymer in the form of fine particles dispersed in the matrix of polyvinyl alcohol are used as a binder contained in the active material layer.

21. The cell of claim 14, wherein the active material layer comprises fluororesin.

22. The cell of claim 19, wherein a fiber of the separator is polyolefin resin, the fiber having been applied with hydrophilic treatment.

23. The cell of claim 22, wherein the treatment is to give polyolefin resin a contact reaction with reaction gas containing fluorine gas.

* * * * *

UNITED STATES PATENT AND TRADEMARK OFFICE
CERTIFICATE OF CORRECTION

PATENT NO. : 5,281,495
DATED : January 25, 1994
INVENTOR(S) : Hirakawa et al

It is certified that error appears in the above-indentified patent and that said Letters Patent is hereby corrected as shown below:

Column 16, lines 36, 37, 38, 39 and 40, change "PVA" to --PVP--

Column 20, line 2, change "PVP" to --PVA--

Column 20, line 38, change "m/g" to --m$^2$/g--

Signed and Sealed this

Thirteenth Day of September, 1994

Attest:

BRUCE LEHMAN

Attesting Officer     Commissioner of Patents and Trademarks